US000001921H

United States Statutory Invention Registration [19]

[11] Reg. Number: H1,921

Fletcher et al.

[45] Published: Nov. 7, 2000

[54] GENERIC WIRELESS TELECOMMUNICATIONS SYSTEM

[75] Inventors: Anthony G. Fletcher; Scott D. Hoffpauir, both of Collierville; Kelvin K. Kinsey; Steve B. Liao, both of Memphis, all of Tenn.

[73] Assignee: DSC/Celcore, Inc., Plano, Tex.

[21] Appl. No.: 09/026,810

[22] Filed: Feb. 19, 1998

Related U.S. Application Data

[60] Provisional application No. 60/060,107, Sep. 26, 1997.

[51] Int. Cl.[7] ..... H04Q 7/20

[52] U.S. Cl. ..... 455/433

[56] References Cited

U.S. PATENT DOCUMENTS

| | | | |
|---|---|---|---|
| 5,487,101 | 1/1996 | Fletcher | 379/60 |
| 5,521,961 | 5/1996 | Fletcher et al. | 379/59 |
| 5,623,532 | 4/1997 | Houde et al. | 379/58 |
| 5,627,881 | 5/1997 | Fletcher | 379/60 |

OTHER PUBLICATIONS

Steve Chen, "*Hybrid MicroSystems: The Ultimate Flexibility in Cellular Applications*", 1996, pp. 1–16, Celcore, Inc., Memphis Tennessee.

"*GlobalHub Mobility Manager—Enables "One Number" PCS Service Via Motorola PPS Residential Products*" pp. 1–2, Celcore, Inc., Memphis Tennessee. 1996.

"*IS–41 Network Hub —The Mobility Manager for Celcore's GlobalSystem*" pp. 1–2, Celcore, Inc., Memphis, Tennessee. 1996.

"*GlobalHub*" pp. 1–10, Celcore, Inc., Memphis Tennessee. 1996.

John Scourias, "*Overview of the Global System for Mobile Communications*", Mar. 27, 1996, pp. 1–16, John Scourias.

Martin A. Iroff & Steve Chen, "A distributed GSM Architecture for Low–Traffic Density Markets", *Mobile Communications International*, Oct. 1996, pp. 1–3, IBC Business Publishing, London, England.

Information pamphlet, Feb. 1997, pp. 1–7, Version 1.0, Celcore, Inc., Memphis, Tennessee.

(List continued on next page.)

*Primary Examiner*—Daniel T. Pihulic
*Attorney, Agent, or Firm*—John G. Flaim

[57] ABSTRACT

A generic telecommunications system and associated methods are disclosed herein. Such generic telecommunications system provides for, among other things, a call processing application that can be used with telecommunications systems that incorporate varying different technologies and standards. Such call processing applications may, for example, include a home location register, visitor location register and mobile switching center elements. In addition, the call processing application may include an application provider and/or a radio controller elements. Those elements are preferably implemented as software entities including one or more software objects. As software entities of the same application, those elements may readily communicate with, and invoke operations associated with, one another. Further, as disclosed herein, software entities of the call processing application may also readily communicate with, and invoke operations associated with, software entities of other applications. In addition, agents associated with the switchign center, may faciliate the call processing of calls originating and terminating in accordance with varying access technologies.

31 Claims, 9 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OTHER PUBLICATIONS

"*BS–20/BS–21, D900/D1800 Base Transceiver Station*", pp. 1–2, Geschaftszweig Mobifunknetze, Munchen, Germany, 1997.

"*Unique Solutions to Complex Challenges to Wireless Carriers*" pp. 1–9, Celcore, Inc., Memphis, Tennessee, 1997.

Michel Mouly and Marie–Bernadette Pautet "*The GSM System for Mobile Communications*", 1992, pp. 79–122, pp. 261–646, Cell & Sys, France.

George Lamb "*GSM made Simple*", 1997, pp. 3–158, Regal Printing, United States of America.

Lawrence Harte, Stever Prokup, and Richard Levine "*Cellular and PCS, The Big Picture*", 1997, pp. 61–181, McGraw–Hill, United States of America.

GENERIC WIRELESS TELECOMMUNICATIONS SYSTEM

CLAIM OF PRIORITY

The instant patent application claims priority from the U.S. provisional patent application designated with Ser. No. 60/060,107, entitled "Cellular Communication System," naming Anthony G. Fletcher and Scott D. Hoffpauir as inventors, and which was filed on Sep. 26, 1997.

RELATED PATENT APPLICATIONS

The instant patent application is directly related to the following patent applications: (a) the U.S. patent application Ser. No. 09/025,870 designated by DSC Case No. 834-00 and Attorney Docket No. 24194000.180, entitled "Integrated Telecommunications System," naming Anthony G. Fletcher and Scott D. Hoffpauir as inventors, and which was filed concurrently with the instant application; (b) the U.S. patent application Ser. No. 09/026,190 designated by DSC Case No. 835-00 and Attorney Docket No. 24194000.181, entitled "Resource Management Sub-System of a Telecommunications Switching System," naming Howard L. Andersen and Scott D. Hoffpauir as inventors, and which was filed concurrently with the instant patent application; (c) the U.S. patent application Ser. No. 09/026,320 designated by DSC Case No. 827-00 and Attorney Docket No. 24194000.173, entitled "Flexible Telecommunications System Architecture," naming Anthony G. Fletcher and Scott D. Hoffpauir as inventors, and which was filed concurrently with the instant patent application; (d) the U.S. patent application Ser. No. 09/026,487 designated by DSC Case No. 833-00 and Attorney Docket No. 24194000.179, entitled "Network Management System Server and Method for Operation, " naming Scott D. Hoffpauir as inventor, and which was filed concurrently with the instant patent application; and (e) the U.S. patent application Ser. No. 09/026,230 designated by DSC Case No. 852-00 and Attorney Docket No. 24194000.197, entitled "Application Provider and Method for Communication," naming Scott D. Hoffpauir and Steve B. Liao as inventors and which was filed concurrently with the instant patent application.

FIELD OF THE INVENTION

The present invention relates to a telecommunications systems, and more particularly, to a generic wireless telecommunications system that accommodates the use of varying types of technologies within a telecommunications systems.

BACKGROUND

Subscribers access, i.e., receive and transmit information to, a telecommunications network through various means, such as a hand held telephone or a personal computer. Numerous types of technologies presently exist, and continue to be developed, to provide for access with respect to a telecommunications network.

Certain of the access technologies concern wireless access to a telecommunications network.

Analog wireless technologies, such those which follow the Advanced Mobile Phone Service (abbreviated AMPS), Total Access Communications System (abbreviated TACS) and Nordic Mobile Telephone (abbreviated NMT) standards, have been used extensively in the past to provide wireless communications services to subscribers. As operators of analog wireless systems desired to add subscribers, more radio channels were needed to accommodate those subscribers since those systems allocated radio channels on a per subscriber basis. To solve this dilemma, digital wireless technologies were developed to allow for capacity increases by allowing more subscribers to share the same radio channel spectrum.

Digital wireless technologies solve some of the deficiencies of analog wireless technologies. Digital wireless technologies do not, however, use a common approach to divide the radio channel spectrum. Rather, one digital wireless technology, known as Time Division Multiple Access (abbreviated TDMA) divides a radio channel into time slots that are individually used by a subscriber unit. Yet another digital wireless technology, known as Code Division Multiple Access (abbreviated CDMA) divides the radio channel spectrum into wideband digital signals that carry different coded channels that are each identified by a unique pseudorandom noise code. Still another digital wireless technology, known as Frequency Division Multiple Access (abbreviated FDMA), increases the number of radio channels within the radio channel spectrum by decreasing the bandwidth assigned to each channel and provides a control channel that coordinates a subscriber unit's access to a voice channel. There presently exists numerous different standards and protocols that use one of the aforementioned different digital wireless technologies yet impose inconsistent requirements. Many standards are accepted in certain regions of the world but not others. There are, for instance, several standards associated with TDMA technology.

Wireline and other technologies also offer subscribers access to a telecommunications network. For example, fixed wireless local loop technology has become an alternative to mobile cellular technology, especially in areas where no wireline infrastructure exists.

Designers and manufactures of cellular telecommunications systems have, and continue to, develop telecommunications systems that are uniquely designed to be consistent with a particular access technology or standard. For example, manufacturers often offer distinct telecommunications systems for analog mobile cellular systems, digital mobile cellular systems, fixed wireless local loop systems, and wireline systems. Such telecommunications systems often use inflexible, monolithic conventional software applications, having thousands of interdependent and loosely organized lines of code, and are designed without regard for use with other technologies. Such conventional telecommunications systems also are typically constructed by distinct equipment and components that are interconnected together. Conventional telecommunications systems therefore do not provide for multiple access technologies or standards and cannot be readily modified to accommodate another access technology or standard. As a result, telecommunications systems are undesirably limited. For example, a conventional wireless telecommunications switching system is not able to receiver a call from a TDMA mobile subscriber and direct that call to a CDMA mobile subscriber. Rather, at least two conventional telecommunications systems would be needed.

SUMMARY OF THE INVENTION

The present invention sets out to, among other things, overcome the aforementioned problems associated with conventional wireless telecommunications systems.

One object of the present invention is to provide a generic telecommunications system that can be readily adapted to accommodate varying wireless technologies and standards.

A further object of the present invention is to isolate the functions of a telecommunications system that vary between technologies and standards, such as, for example, within a given software layer or application.

Another object of the present invention is to provide a telecommunications system that provides for distinct elements for different components of conventional telecommunications systems.

Still another object of the present invention is to provide a telecommunications system wherein the functionality of one or more elements is sufficiently isolated so that such elements may be modified or replaced without having an adverse impact on other elements, i.e., a low coupling of elements.

Yet another object of the present invention is to provide a telecommunications system that integrates functionality found in distinct functional equipment and components of conventional telecommunications systems.

An additional object of the present invention is to provide software entities that correspond with equipment and components of conventional telecommunications systems, and to provide for effective communication and cooperation between such elements.

A further object of the present invention is to provide a call processing architecture that facilitates the use of varying technologies, standards and protocols.

In accordance with the present invention, a generic telecommunications system is provided for use in connection with varying wireless technologies and standards. Such generic telecommunications systems includes a call processing application that incorporates functions which differ when employing various technologies and standards. Such call processing application includes software entities, which comprise one or more software objects, that model conventional components. For example, in accordance with the present invention, the call processing application may include a software entities that model a home location register, a visitor location register and a switching center. All such elements are conventionally provided as distinct equipment using structured programming techniques. By modeling those elements as software entities, the functionality provided by those software entities can be modified and changed, and even removed, with relative ease. Other elements that may be included within the call processing application include an application provider to provide protocol related information to the home location and visitor location register elements (such as, for example, mobile application part protocols) and a radio controller (such as, for example, a base station controller called for by the GSM standard).

In accordance with one aspect of the present invention, the software entities of the call processing application may communicate with software entities of other software applications or layers. Software entities may include one or more software objects that encapsulate operations and data. Software entities of the call processing application are configured to invoke operations found in other entities. This can be done through the use of object broker technology. For example, an object request broker element may be associated with the call processing application and used to store information concerning the operations of software objects of those software entities. Software entities and their associated objects existing on other applications may then employ that object request broker to address entities and objects of the call processing application. Similarly, an object request broker may be provided for operations of software entities of other applications which may be invoked by software entities of the call processing application. As another example, a proxy may be provided in association with a software entity of a call processing application to invoke operations of a software entity not residing in that application. Similarly, a proxy may be provided in association with a software entity not residing in the call processing application to invoke operations of a software entity within that application.

In accordance with another aspect of the present invention, a call processing architecture is provided which facilites the employment of varying access technologies. Such call processing architecture uses agents for various access technologies. Different agents are provided to process calls with different protocols.

Other and further objects, aspects, features and advantages of the present invention will be apparent from the following detailed description of an exemplary embodiment of the invention, given for the purpose of disclosure and taken in conjunction with the accompanying drawings.

BRIEF DESCRIPTION OF THE DRAWINGS

The present invention may be better understood from the following detailed description of an exemplary embodiment of the present invention with reference to the accompanying drawings, in which:

FIG. 1 illustrates an exemplary wireless communication system according to an exemplary embodiment of the present invention;

DETAILED DESCRIPTION OF AN EXEMPLARY EMBODIMENT OF THE PRESENT INVENTION

Figure 1:
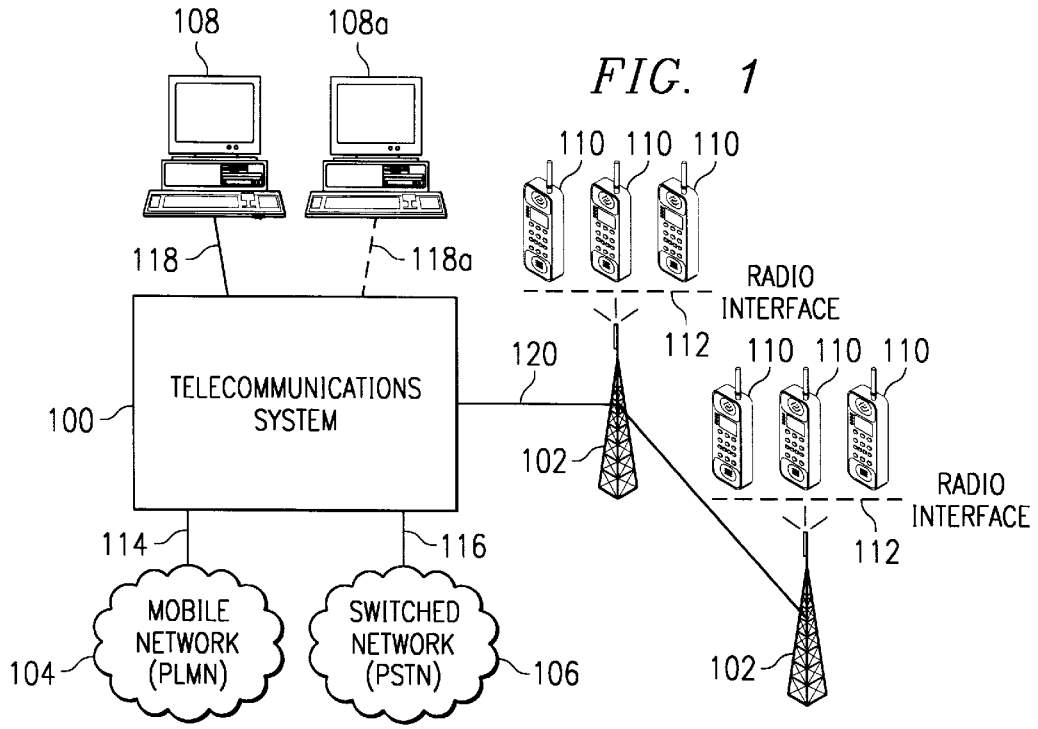
FIG. 1 is a diagram that illustrates a telecommunications system and certain connections associated with that telecommunications system, in accordance with an exemplary embodiment of the present invention.

FIG. 1 illustrates an integrated, wireless telecommunications switching system 100 and certain connections associated with that telecommunications system 100, in accordance with an exemplary embodiment of the present invention. The telecommunications system 100 is operable to provide speech and data services to multiple subscriber units 110. Each subscriber unit 110 provides an interface to a human user, such as through use of a microphone, loudspeaker, display or keyboard of a subscriber unit, or provides an interface to terminal equipment, such as an interface towards a personal computer or facsimile machine, or both. While the subscriber units 110 are illustrated in FIG. 1 as hand held mobile units, it should be appreciated that the implementation of the subscriber units 110 is not so limited. For example, the subscriber units 110 may comprise a fixed antenna assembly connected to a telephone or other interface device. A smart card (not illustrated) may be embodied within a subscriber unit 110 to provide such subscriber unit with subscriber related information and encryption keys.

Communications to and from the subscriber units 110 are established over a radio interface 112 by one or more base stations 102. Base stations 102 directly communicate with subscriber units 110 over radio frequency signals transmitted from, and received by, the base stations over the radio interface 112. Base stations 102 may, for example, include radio transmission and reception devices, antenna assemblies, signaling processing logic specific to the radio interface 112 between the base stations and the subscriber units 110.

A base station 102 is preferably responsible for providing communications to subscriber units 110 located within a particular region, commonly referred to as a service area or cell. One or more base stations 102, typically in a common area, may be logically grouped into what is commonly referred to as a base station site.

The telecommunications system 100 is connected to the base stations 102 by a link 120, such as an E1 or T1 telecommunications line, that provides one or more suitable transmission channels. Digital representations of speech or data information are transmitted over the link 120 between the telecommunications system 100 and the base stations 102, at a predetermined transmission rate.

The telecommunications system 100 is further connected to a mobile network 104 over a link 114 and a switched network 106 over another link 116. A switched network 106 (for example, the Public Switched Telephone Network or PSTN), typically carries voice and data services to fixed locations. Signals transmitted over the switched network link 116 may therefore include ISUP and R2 type signals. A mobile network 104 (for example, the Public Land Mobile Network or PLMN) typically carries data related to mobile or subscriber units. Signals transmitted over the mobile network link 114 may therefore include SS7 and MAP type signals in addition to R2 and ISUP type trunks.

Configuration of the telecommunications system 100 is preferably accomplished by a graphical user interface associated with a local terminal 108 over a wireline connection 118 or associated with a remote terminal 108*a* over a modem link 118*a*.

Figure 2:
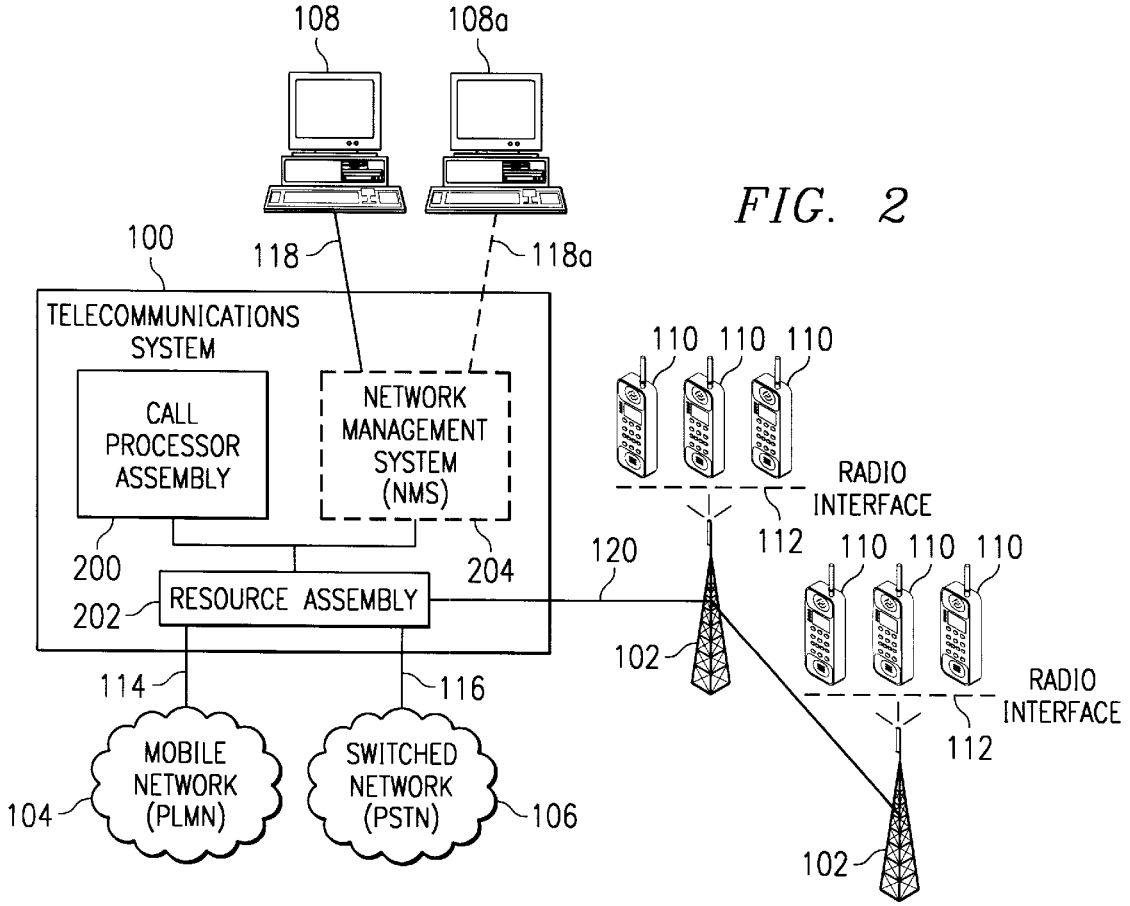
FIG. 2 is a diagram that illustrates various assemblies and systems that may be included within a telecommunications system, in accordance with an exemplary embodiment of the present invention.

FIG. 2 illustrates various assemblies and systems that may be included within the telecommunications system 100, in accordance with an exemplary embodiment of the present invention.

A resource assembly is preferably included within the telecommunications system 100. That resource assembly 202 is preferably connected, either directly or indirectly, to base stations 102 over one link 120, a switched network 106 over another link 116, and a mobile network 104 over yet another link 114. Within the telecommunications system 100, the resource assembly 202 is preferably connected to a call processor assembly 200 as well as a network management system 204. The resource assembly 202, in addition to providing an interface to base stations 102, a switched network 106 and a mobile network 104, includes resources that are available to be employed by the call processor assembly 200.

The call processor assembly 200 includes elements that are operable to process calls directed to, or received from, subscriber units 110, a switched network 106 and a mobile network 104. The call processor assembly 200 is operable to handle call processing functions needed by the telecommunications system 100, including call origination, location updating, handovers between cells, trunking and call termination. The call processor assembly 200 may include a general purpose computing platform, such as an Intel Pentium II based computing platform, that includes suitable hardware and/or software systems to support call processing functions. The call processor assembly 200 may use a real-time operating system, such as a QNX operating system, to support the real-time call processing requirements of telecommunications system 100.

As illustrated in FIG. 2, the network management system 204 may be embodied within the telecommunications system 100 or external to the telecommunications system 100. Certain elements of the network management system 204 are preferably provided within the telecommunications system 100 while others are provided externally. It should also be appreciated that while the call processor assembly 200, resource assembly 202 and network management system 204 are illustrated as distinct assemblies, some or all of the functionality of those entities may nevertheless be integrated into a single assembly consistent with the spirit and scope of the present invention.

In accordance with the present invention, a software architecture including more than one software layer is associated with the telecommunications system 100. The functions of the telecommunications system 100 are preferably logically divided or partitioned amongst the layers, i.e., each layer preferably includes a distinct logical grouping of like or similar functions. Functions of a software layer are further logically divided among one or more encapsulated software entities. A software entity may comprise one or more encapsulated software objects. A software layer therefore isolates the software entities included in the layer from other layers. A software entity and its associated objects further isolate those functions by encapsulation. This allows for such software layers and software entities to be developed relatively independently of one another. Although providing for isolation by use of software layers and entities, the present invention also provides for communications between the software layers and entities, and in particular, the ability for a software entity found in one software layer to communicate and use operations of another software entity found in a different software layer.

Figure 3A:
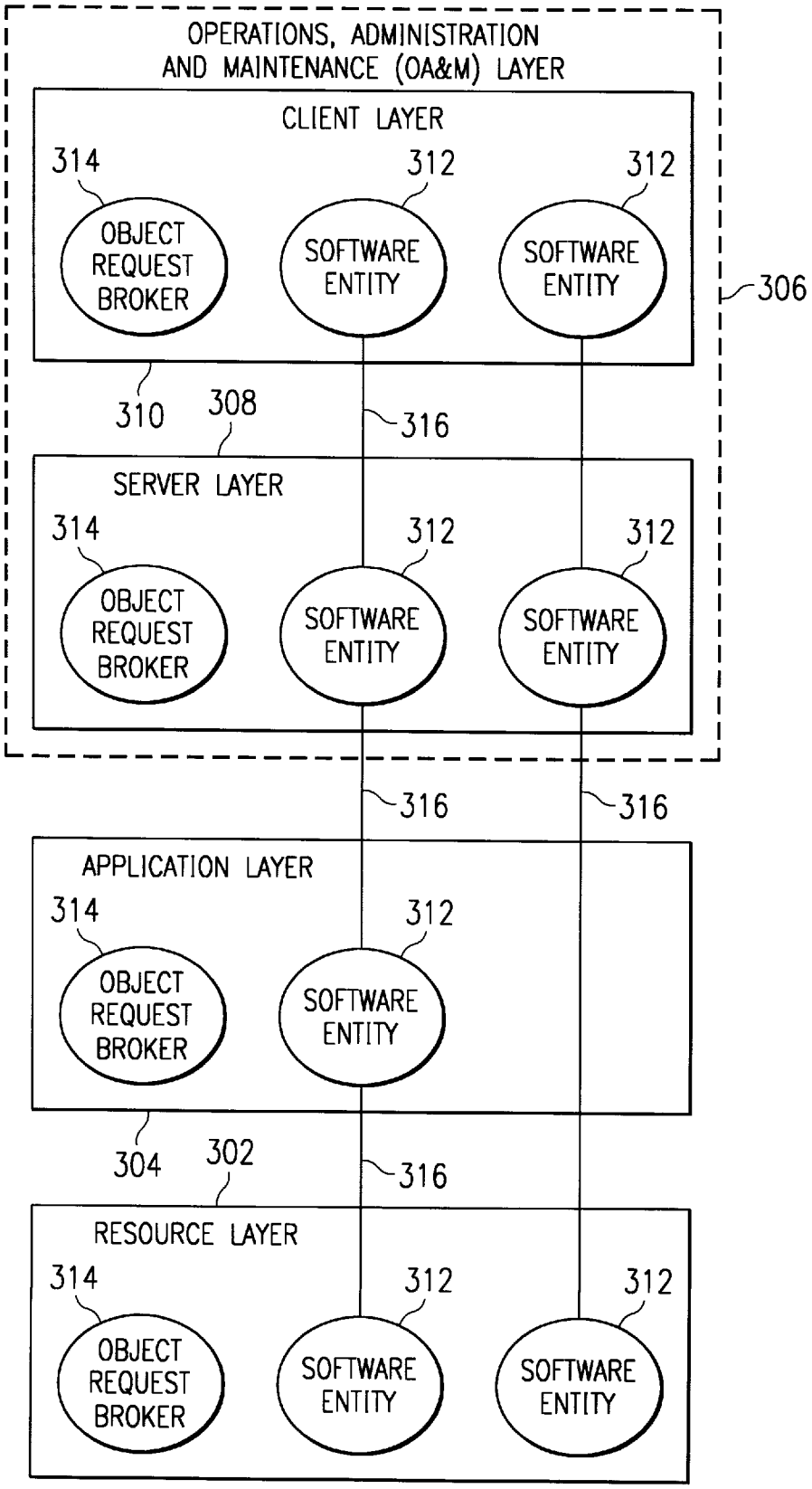
FIG. 3A is a diagram that illustrates an architecture of a telecommunications system, in accordance with an exemplary embodiment of the present invention.

FIG. 3A illustrates an architecture of the telecommunications system 100, in accordance with an exemplary embodiment of the present invention.

More than one software layer is provided in accordance with the present invention. As illustrated in FIG. 3A, three primary software layers 302–306 may be provided in accordance with an exemplary embodiment of the present inventions. Such software layers 302–306 may, for example, correspond with the resource assembly 202, call processor assembly 200 and network management system of the telecommunications system 100. For instance, the telecommunications system 100 may include a resource layer 302, an application layer 304 and an operations, administration and maintenance (abbreviated OA&M) layer 306. The resource layer 302 may function to control and administer the operation of hardware modules and components provided within the resource assembly 202, including management and provision of telephony resources and switching functions provided within the resource assembly 202. It may further control and administer communications between the application layer 304 or the OA&M layer 306 and the resource assembly 202. The application layer 304 provides specific call processing functions, such as switching related functions. As such, the application layer 304 preferably includes one or more functional elements that collectively implement one or more specific particular call processing applications in accordance with one or more standards, such as the GSM standard. An example of a call processing application consistent with the GSM standard is described below in connection with FIG. 5. Preferably, the application layer 304 isolates those functions that pertain to a particular telecommunications standard so that the application layer 304 can be readily modified to reflect changes in that standard or so that a presently implemented standard can be replaced with another standard, as discussed below in connection with FIG. 5. The OA&M layer 306 may provide a user interface to receive operations, administration and maintenance related requests and provide services in response to those requests. Such services may include: configuration management services to modify configuration information used by the resource layer 302 and application layer 304; performance management services to periodically collect and summarize system performance and traffic information; fault management services to detect, log and report failures; accounting management services to create and store billing related records; system management services to monitor and initiate tests and resets of hardware and software; and security management services to control access to the network management system 204.

The OA&M layer 306 is preferably separated into a client layer 310 and a server layer 308. Preferably, the client layer 306 provides a user interface and receives requests for the aforementioned services while the server layer 310 provides and manages requests received from the client layer 306. The client layer 306 is operable to present information, requested by the client layer 306 and provided by the server layer 308, to a user through a graphical user display. A user can adapt and modify such information. In contrast, the server layer 308 validates and causes the storage of information provided by the client layer 306, as well as forwards appropriate information to the application layer 304 and resource layer 302. The server layer 308 also supplies the client layer 306 with appropriate information to display to a user. One or more databases (not illustrated) are accessible by the server layer 308 to store information related to the services, such as configuration information that is used by the application layer 304. An example of a client layer 310 and a server layer 308 is described below in connection with FIG. 6.

One or more processors (not illustrated) are associated with each software layer 302–310. The number and type of processors associated with each software layer 302–310 may be different and should be selected based on the particular requirements of, and benefits derived by, each such layer. Similarly, software layers 302–310 may employ different programming languages and operating systems and should be selected based on the particular requirements of, and benefits derived by, each such layer.

It should be appreciated that the number of software layers 302–310, as well as the software entities 312 associated with each such layer, is of no consequence with respect to the scope of the present invention. It should further be appreciated that while the various software layers 302–310 need not be co-located, i.e. they may be stored and executed at remote locations and within different products. As such, migration of functionality is accommodated by the present invention. For example, it may become desirable for some or all of the functionality of a given layer 302–310 to be executed by one or more processors not provided within the telecommunications system 100. Such layer and its associated functionality may therefore, in accordance with the present invention, be readily migrated to hardware platform of an external system. As another example, an existing layer 302–310, such as the client layer 306, may be replaced by another application preferred by an operator of a telecommunications product. As yet another example, a particular software entity 312, such as a home location register 504 discussed below in connection with FIG. 5, may be inactivated in favor of another provided externally. The present invention therefore provides a great deal of flexibility to continually adapt and modify a telecommunications system 100 as needed or desired.

A software layer 302–310 may include one or more software entities 312. Software entities, as used herein, comprises one or more software objects that collectively model, for example, a particular component. One example of a software entity 312 is a composite software object. Software objects generally encapsulate one or more operations or methods and associated data to model various functions of, for example, a particular component and variables to reflect information about the characteristics and states of that component. Peer software objects i.e., software objects within the same layer 302–310 or entity, may be coupled by a virtual connection so that they can interact and communicate with one another. For example, one object can invoke or call an operation or method associated with another object. This is ordinarily accomplished by the sending of a message from one object (known as the originating object) requesting that a specified operation or method be carried out by another object (known as the target object) . After receiving the request, a target object sends a response to the originating object. One target object may respond to the same message differently from another target object. This result is sometimes referred to as polymorphism. Objects, which include encapsulated methods, interact by exchanging messages. A message typically identifies a target object, a method of the target object and (in some cases) a set of parameters that the method requires to carry out its function. Various commercially available tools and languages may be used to create software objects, such as Smalltalk, C++ and Java. To readily create software objects, a class of objects may be defined. Classes provide a template that defines common methods and variables in a set of related objects. Different objects belonging to a class, commonly referred to as instances of a class, each include particular values for the variables of the class. Classes are specified by a message interface and an implementation of that interface. A message interface specifies, with respect to a given class of objects, those messages to which objects of the given class will respond, whereas an implementation specifies how responses to messages are carried out.

In accordance with the present invention, a given software entity 312 may form a virtual connection 316 with another entity 312, whether or not such other entity 312 is in the same software layer 302–310 as the given entity or another layer. More specifically, a virtual connection 316 is formed between an originating software object and a target software object of different software entities 312 of different software layers 302–310. A virtual connection 316 may, for example, be accomplished by sending a message from an originating software object, and receiving a response to such message from a target software object. To accomplish a virtual connection 316 between software entities 316 provided on distinct software layers 302–306, object request broker technology is preferably employed in accordance with the present invention. Object request broker technology includes those software products made pursuant to the Common Object Request Broker Architecture (abbreviated CORBA) standard and the Distributed Component Object Model (abbreviated DCOM) technology. By employing object request broker technology within the telecommunications system 100, a communications and transport mechanism is provided whereby any software entity 312 may effectively communicate with another software entity 312 regardless of the nature and environment associated with each such entity.

Object request broker technology may be considered to provide a message transport mechanism or bus that functions to provide for the formation of virtual connections 316 between software entities 312 of different software layers 302–310.

More specifically, object request broker technology is operable to transport a message from an originating object of a software entity 312 in one software layer 302–310, to cause delivery of that message to a target object of a software entity 312 in another layer, and then to cause return of a response to the originating object. Use of object request broker technology therefore allows for remote messaging by providing a communications channel between remote entities 312. In other words, a software entity 312 in a given software layer 302–310 may invoke a method associated with a target object of another software entity 312 that is found in another layer. In this fashion, the target object is not made aware of the mechanisms used to communicate with it. Use of object request broker technology to facilitate communications between two software entities 312 allows for a client-server relationship between such entities wherein the originating object acts as a client and the target object acts as a server. Numerous advantages are thus gained by the use of object request broker technology to provide interoperability among the various entities 312 and software layers 302–310 of the telecommunications system 100.

One or more elements, referred to and identified herein as object request brokers 314, are preferably provided with respect to each software layer 302–310. Preferably, an object request broker 314 is provided for those software entities 312 executed by each processor. An object request broker 314 preferably comprises one or more software objects, and resides together with other software entities 312 of a given software layer 302–310. It relieves an originating object of the burden of tracking the location of remote objects to which an originating object desires to send a message. Accordingly, an object request broker 314 essentially provides a location service by which target objects can be located by originating objects. Locating a target object is preferably based on a name or numeric identifier associated with the target object, sometimes referred to as an object reference. In operation, an originating object, the object seeking to send a message, initially provides information to the object request broker 314 and requests the location of a target object and/or an operation sought to be invoked by the originating object. In turn, the object request broker 314 provides such location and/or the appropriate interface for the operation sought to be invoked, which allows an originating object to send a message to the target object. Since an originating object typically does not maintain sufficient information to directly send a message to a target object without information provided by an object request broker 314, the location of the target object is thus transparent to the originating object. Accordingly, an object request broker 314 can be said to facilitate communications between originating and target objects of different software layers 302–310.

An alternative to providing a centrally located object request broker 314 is distributing those functions that have been described above as being embodied within the object request broker 314 amongst software entities 312 or objects comprising associated with a software entity 312.

One or more proxies (not illustrated) are preferably provided with respect to an originating entity 312. A proxy is preferably a software object that acts as a local representative of a software object located in a different software layer 302–310. As such, a proxy shields an originating object from appreciating that a target object is remotely located. A proxy may represent a remote target object to an originating object of a given software layer 302–310. By using a proxy, the target object appears to the originating object as a peer object. In operation, a proxy may receive a message or request from an originating object concerning a target object and/or an operation of a target object.

A proxy may be used to provide either a static or dynamic interface to an originating object. Preferably, an originating object requests information from an object request broker 314 concerning the location of a remote target object and/or the interfaces for operations of the target object that can be invoked by the originating object. As a result of such request, a bind is performed whereby a proxy is created within the software entity 312 of the originating object and a direct communication path is formed between the proxy and the target object selected by the object request broker 314. That proxy preferably includes the various operations of the target object that can be invoked by the originating object. Upon provision of such proxy, the originating object may issue a request to that proxy to invoke one of the identified operations of the target object. In turn, that proxy relays that request to the target object. Alternatively, a proxy may redirect a message or request from an originating object to a target object of the remote software layer 302–310, provided that the proxy is provided with, and maintains, sufficient information to do so.

A proxy is preferably configured to receive a response from a target object and to transmit that response to the originating object associated with such proxy. By providing a proxy for an originating object, knowledge that a remote target object is not commonly located with the originating object is shielded from 312 the originating object or other software objects within the same software entity 312 or layer 302–310. Rather, such knowledge is limited to the proxy. A proxy is therefore interchangeable with a remote target object to which it is responsible for conveying and receiving messages. As such, the operations or methods associated with a remote target object may be incorporated within its associated proxies without adversely affecting other software objects or software entities 312 or their associated proxies.

To send a message to a target object, an originating object must know how to address the target entity 312 but not the implementation details associated with the target object, such as the programming language, operating system, processor, tools, network and other aspects associated with a target objects. Addressing a target object, and invoking an operation thereof, calls for knowledge of the specifications of a message interface of the target object. Adherence to the interface specifications allows an originating object to communicate with a target object. An object request broker 314 preferably maintains and provides (or publishes) those interfaces of a target object (sometimes referred to as being published) that can be utilized by originating objects.

An interface to a particular method or operation of a target object—sometimes referred to as a method invocation interface or message interface—is preferably defined and specified by a standard definition language. For example, a method invocation interface may be specified by use of Interface Definition Language (IDL) consistent with the CORBA standard. IDL provides an interface for a given software object, independent of programming language and operating system, to other objects and software entities 312 that are associated with a CORBA architecture. As such, it allows originating and target objects written in different programming languages and associated with different operating systems to communicate and interoperate with one another. Using IDL, a method invocation interface is specified by identifying various data related to an interface of a software object. Such data includes the object's attributes, classes from which the object inherits, exceptions raised by the object, typed events emitted by the object and the methods of the object that can be invoked by other objects, including input and output parameters and data types of those parameters.

A method invocation interface may be either static or dynamic. A static interface is defined at the time that the software entities 312 are compiled, whereas a dynamic interface is defined during run-time. For example, a proxy may provide a static interface by which a virtual connection 316 may be formed between software entities 312. Consistent with CORBA, an interface repository may be provided to store interface specifications used to construct dynamic interfaces. That interface repository may, for example, dynamically change and be accessed during run-time.

Figure 3B:
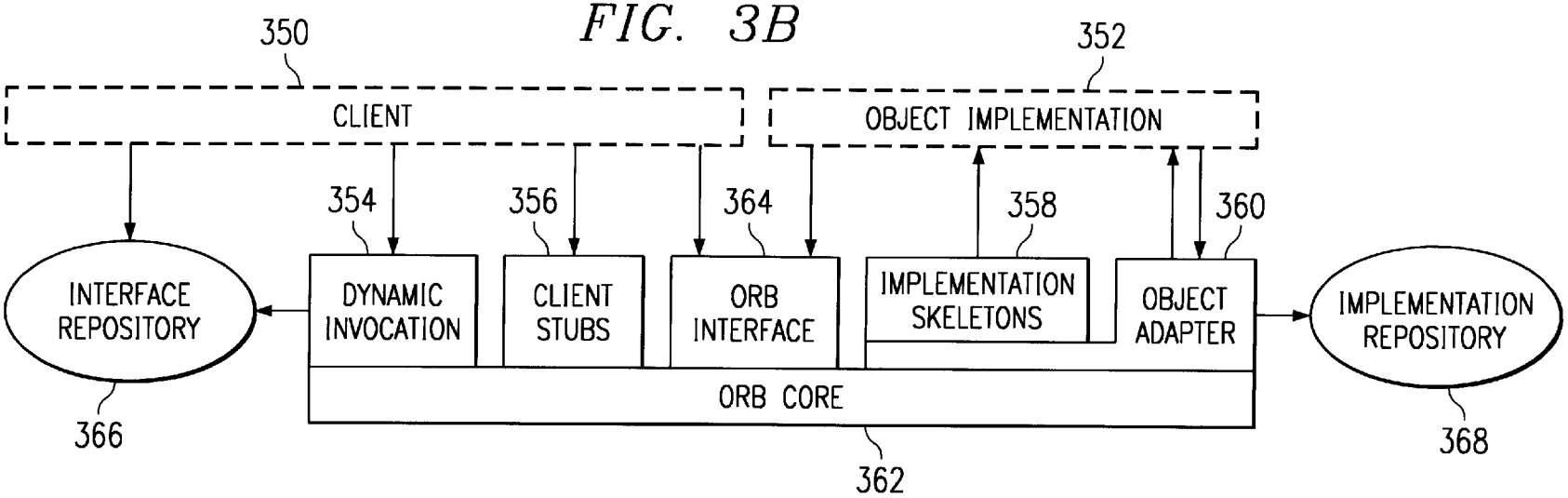
FIG. 3B is a diagram that illustrates an object request broker structure pursuant to the CORBA 2.0 standard, in accordance with an exemplary embodiment of the present invention.

FIG. 3B illustrates an object request broker structure pursuant to the CORBA 2.0 standard, in accordance with an exemplary embodiment of the present invention.

In accordance with that standard, an originating object is deemed a client 350 while the methods or services of a target or server object sought to be invoked by the client are deemed to be an object implementation 352. According to CORBA 2.0, certain elements are employed to provide an object request broker environment. One or more client stubs 354 and dynamic invocation elements 356 are utilized by a client 350. Similarly, one or more implementation skeletons 358 and object adapters 360 are utilized by an object implementation 352. Further, one or more ORB interfaces 364 are provided for use by clients 350 and object implementations 352. Such elements are preferably implemented in software and communicate with one another over an ORB core 362, which may, for example, use CORBA's 2.0 Internet Inter-ORB Protocol (IIOP) services. Other elements, such as one or more interface repositories 366 and implementation repositories 368, are also employed consistent with CORBA 2.0.

CORBA 2.0 provides for both static and dynamic programming interfaces to be provided between a client 350 (for example, an originating object) and an object implementation 352 (for example, a target object). Specifically, a client 350 may issue requests to remote object implementations 352 through either a client stub 356 or a dynamic invocation interface 354. Both client stubs 356 as well as interface repositories 366, which are utilized by dynamic invocation elements 354, are created through the use of IDL.

Client stubs 356 are provided with respect to a client 350 to provide static interfaces to object implementations 352. That is, client stubs 356 represent particular methods or operations that may be invoked by a client 350. Client stubs 356 may be precompiled using IDL and generated by an IDL compiler. Preferably, a distinct client stub 356 is provided for each method or operation invoked with respect to a given client object. Client stubs 356 thus act as proxies for a client 350, and may reside locally relative to a client 350. A client stub 356 is preferably operable to encode and decode messages and requests made by a client 350, including the method and parameters identified in a message or request, into a suitable message format that is directed to an object adapter 360 and then to an implementation skeleton 358, as discussed more fully below.

Dynamic invocation elements 354 are provided with respect to a client 350 to provide dynamic interfaces to object implementations 352. Dynamic invocation elements 354 allow for a client 350 to dynamically construct an interface to invoke methods or operations at run-time. This is in contrast to client stubs 356 which provide for a predetermined interface. Dynamic invocation elements 354 are operable to define an interface by accessing an interface repository 366, generating parameters, issuing remote calls, and obtaining results with respect to an object implementation 352. An interface repository 366 provides for interface descriptions, supported methods and required parameters with respect to remote object implementations 352 for access and use by dynamic invocation elements 354. Clients 350 may therefore dynamically access, and object implementations 352 may therefore store and update, information required to uniquely and globally identify a particular interface of a given object implementation 352 so as to allow formation of a virtual connection 316 between the client 350 and that object implementation.

An ORB interface 364 is accessible by both clients 350 and object implementations 352. An ORB interface 364 is operable to provide a distinct set of services to a client 350. Those services may include, for example, operations to return an interface type, converting an object reference to a string, as well as various management functions.

Whether a static or dynamic invocation, requests for service are transmitted to an object adapter 360. An object adapter 360 is interposed between an ORB core 362 and implementation skeletons 358, and is operable to accept requests for service on behalf of a given server object. An object adapter 360 provides a run-time environment for instantiating server objects, as well as passing requests to server objects and signing identification information to server objects (which are referred to as object references). Further, an object adapter 360 preferably registers the classes of objects it supports and their associated run-time instances with an implementation repository 368. An implementation repository 368 maintains information provided to it by an object adapter 360, and is operable to store additional information, such as trace information, audit trails, security and other administrative data.

Implementation skeletons 358 provide the interface through which a method of an object implementation 352 receives a request, which originated either from a client stub 356 or a dynamic invocation element 354. Object implementations 352 thus receive requests through implementation skeletons 358 without knowledge of the invocation approach, i.e., whether through a static or dynamic interface. Since both static and dynamic invocations have the same message semantics in accordance with CORBA 2.0, messages provided to an object implementation 352 typically do not indicate whether such messages derived from a client stub 356 or a dynamic invocation element 354. Implementation skeletons 358 correspond with client stubs 356 and dynamic invocation elements 354. That is, implementation skeletons 358 can provide for either a static interface or dynamic interface to an object implementation 352. Implementation skeletons 358 may include static skeletons (not illustrated) and dynamic skeleton invocation elements (also not illustrated). Static skeletons, like client stubs 356 with respect to clients 350, provide static interfaces to messages exported by an object implementation 352. These skeletons, like client stubs 356, are created using an IDL compiler. Dynamic skeleton invocation elements provide a run-time binding mechanism for object implementations 352 that do not have IDL-compiled static skeletons. A dynamic skeleton invocation element thus analyzes the parameter values of an incoming message to determine the target entity and method, and direct the message to the corresponding object implementation 352. As such, a dynamic skeleton invocation element is the server equivalent of the dynamic invocation element 354.

While FIG. 3B and its associated description illustrate and describe a particular implementation that can be used to provide a suitable object request broker environment consistent with the present invention, it should be appreciated and understood that such implementation is exemplary and that other implementations and variations may also be used within the scope and spirit of the present invention.

Figure 4:
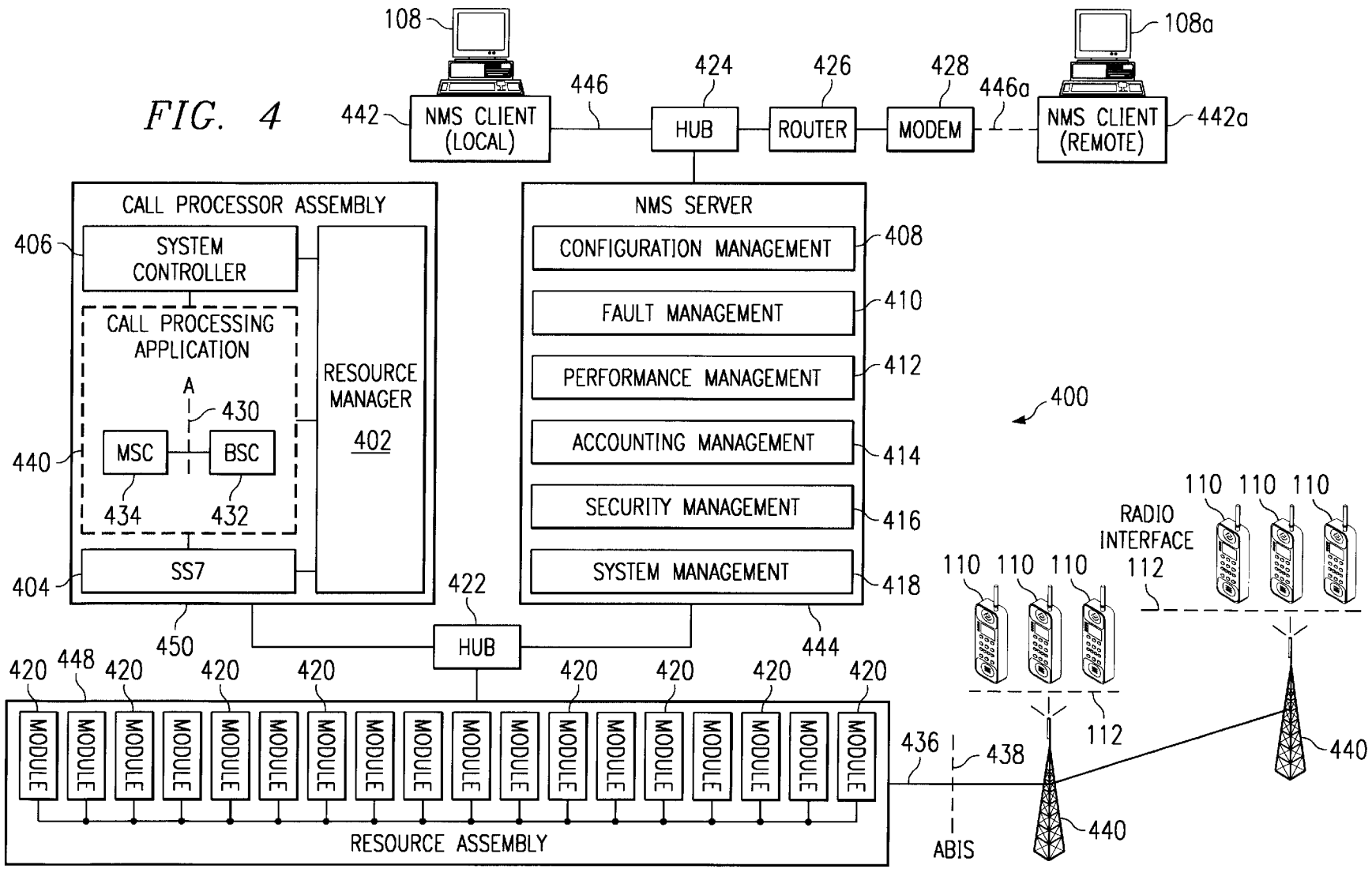
FIG. 4 is a diagram that illustrates a telecommunications system, designed consistent with the GSM standard and in accordance with an exemplary embodiment of the present invention.

FIG. 4 illustrates a telecommunications system 400, designed consistent with the GSM standard and in accordance with an exemplary embodiment of the present invention.

In accordance with the GSM standard, one or more base transceiver stations 440 are provided to communicate with subscriber units 110 over a radio interface 112. Such base transceiver stations 440 are connected to the resource assembly 448 through a link 436, which provides one or more suitable transmission channels. Digital representations of speech or data information are transmitted over the link 436 at a predetermined transmission rate. Such link 436 may, for example, be an E1 or T1 telecommunications line.

The interface 438 between base transceiver stations 440 and a base station controller 432 is, pursuant to the GSM standard, known as the Abis interface. The Abis interface 438 provides message flow between a base station controller 432 and base transceiver stations 440, and also manages message flow between subscriber units 110 and other network elements.

The Abis interface 438 is thus interposed between base transceiver stations 440 and the telecommunications system 400 itself. Digital representations of speech or data information are transmitted through the Abis interface 438, that is, between the telecommunications system 400 and the base transceiver stations 440, at a predetermined transmission rate. For example, digital representations of speech or data information may be transmitted over the link 120 connecting the base transceiver stations at a rate of 16,0000 bits per second.

The call processor assembly 450 preferably includes a call processing application 440 which includes, among other elements, a base station controller 432 (abbreviated BSC) and a mobile switching center 434 (abbreviated MSC), which is sometimes also referred to as a mobile services switching center. Signaling and voice data is exchanged between the interface between the base station controller 432 and mobile station controller 434, known as the A interface 430.

The base station controller 432 is responsible for management of the base transceiver stations 440 and their radio interfaces 112, including the allocation and release of radio channels associated with a given radio interface 112 and management of handovers from one base transceiver station 112 to another base transceiver station 112. The base station controller 432 manages the base transceiver stations 440 and their radio interfaces 112 through the allocation, release and handover of radio transmission channels. The base station controller 432 may carry out various procedures that relate to call connection tasks. For example, the base station controller 432 may be responsible for system information broadcasting, subscriber paging, immediate traffic channel assignment, subsequent traffic channel assignment, call handover, radio connection and release, connection failure detection and reporting, and power capability indication reporting. The base station controller 432 may also be responsible for management of both the Abis interface 438 and the A interface 430.

The mobile switching center 434 coordinates the allocation and routing of calls involving the subscriber units 110 of the telecommunications system 400 by, among other things, receiving dialed digits, interpreting call processing tones and providing routing paths. For example, the mobile switching center 434 is operable to process a service request from a subscriber unit 110, and route a corresponding call to the designated switched network 106, a mobile network 104 or to another subscriber unit 110. Similarly, the mobile switching center 434 is operable to process a service request from a mobile network 104 or switched network 106, and route a corresponding call to a designated subscriber unit 110. The mobile switching center 434 is primarily responsible for mobility management, call control and trunking, such as coordinating the setting-up and termination of calls to and from subscriber units 110. Additionally, it provides all of the functionality needed to handle mobile subscribers units 100 through location updating, handover and call delivery.

The interface between the base station controller 432 and the mobile switching center 434 is, pursuant to the GSM standard, known as the A interface 430. The A interface 430 provides the link for managing traffic channels/transcoders, and also provides the mobile switching center 434 with access to base transceiver stations 112 for message flow with the subscriber units 110. The Base Station Subsystem Management Application Part (abbreviated BSSMAP) protocol may be employed to transmit connection-related messages and paging messages between the mobile switching center 434 and base station controller 432. Preferably, the base station controller 432 and the mobile switching center 434 are implemented as distinct entities, such as separate software objects that communicate with one another so that the A interface 430 is logically discernible.

In addition to the call processing application 440, the call processor assembly 450 preferably includes several other elements, namely, a resource manager 402, a SS7 element 404 and a system controller 406. While the resource manager 402 is preferably included in the call processor assembly 450, it may also be included in the resource assembly 448 within the scope of the present invention.

Management and allocation of resources provided by the resource assembly 448 with respect to the call processor assembly 450 is carried out by the resource manager 402. That is, the resource manager 402 acts as the bridge between the call processing application 440 and the resource assembly 448 by enabling different elements of the call processing application 440 to interface with resources of the resource assembly 448. Preferably, the resource manager 402 also provides an interface to resources of the resource assembly 448 for the SS7 element 404 as well as remote elements, such as the system controller 406 and various elements of the network management system 204.

The resource manager 402 is preferably implemented in software as a software entity that comprises one or more software objects. It preferably interfaces with other software entities 312 through the use of object request broker technology. In accordance with an exemplary embodiment, the resource manager 402 provides a proxy for other software entities 312 in which the resource manager 402 may seek to invoke a method or operation. Similarly, a proxy may be associated with a software entity 312 other than the resource manager 402 which may seek to invoke a method or operation associated with the resource manager 402. An interface is preferably defined between each such proxy to establish acceptable messages and responses that can be exchanged over the defined interface so as to allow a virtual connection to be formed therebetween. The SS7 element 404 provides the logic needed to provide SS7 signaling functionality for SS7 connectivity to a switched network 106. It is responsible for performing various functions and interfaces associated with the various parts and protocols that are included within SS7 signals. Further details of the resource manager 402 and the SS7 element 404 are provided in the U.S. patent application Ser. No. 09/026,190 designated by DSC Case No. 835-00 and Attorney Docket No. 24194000.181, entitled "Resource Management Sub-System of a Telecommunications Switching System," naming Howard L. Andersen and Scott D. Hoffpauir as inventors, filed concurrently with the instant patent application, and which is incorporated by reference herein for all purposes.

The system controller 406 is responsible for ensuring that the call processor assembly 450 is operating properly by periodically testing elements of the call processor assembly 450. A successful test of an element of the call processor assembly 450 may comprise, for example, observing a predetermined response from the element after sending a predetermined message to the element. This is sometimes referred to as "pinging" an element.

The NMS server 444 includes several elements for configuring and managing elements of the call processor assembly 450 and resources of the resource assembly 448. Specifically, the NMS server 444 includes the following elements: configuration management 408, fault management 410, performance management 412, accounting management 414, security management 416, and system management 418. Those elements are operable to provide operations, administration and maintenance related services, and preferably include one or more logical servers.

The configuration management element 408 includes one or more servers to provide services necessary to administer the configurable attributes of the main functional elements associated with the call processing application 440, the resource manager 402 and the SS7 element 404. As such, the configuration management element 408 is operable to modify configuration information associated with the call processing application 440, such as administration of subscriber databases, as well as the configuration of specific elements of the call processing application, such as the base station controller 432 and mobile switching center 434. Servers of the configuration management element 408 preferably contain software objects that retain attribute information so as to allow an operator to configure the corresponding functional component of the call processing application 440, the resource manager and the SS7 element 404. The fault management element 410 provides for the detection, logging and reporting of alarms, errors, and selected events from the call processor assembly 450 and the resource assembly 448. The performance management element 412 provides for the periodic collection and analysis of system performance and traffic information from the resource assembly 448 and call processing application 440. The accounting management element 414 attends to the creation and storage of billing records for calls originated or terminated to a subscriber unit 110, as well as calls forwarded to or from a subscriber unit 110. Such billing records are in the form of a call data record. The security management element 416 provides for discriminatory access to operation, administration and maintenance operations based on the given operator of the network management system 204. Various security levels are defined that determine the operations that are available to a given operator. The system management element 418 supports the start-up and recovery functions of the telecommunications system 400. It is operable to initiate tests to assess the operation of various elements and resources, and to cause the reset of such elements and resources in the event of incorrect operation.

Multiple modules 420 are provided within the resource assembly 448. Preferably, such modules are replaceable line cards that are interconnected to one another over a backplane. Particular resources are preferably provided on distinct modules 420. Alternatively, particular resources are distributed over such modules 420.

Preferably, an ethernet hub 422 allows the call processor assembly 450, the resource assembly 448 and the NMS server 444 to communicate with one another. Another ethernet hub 424 is provided to allow the NMS server 444 to communicate with both the local NMS client 442 and the remote NMS client 442*a*. That ethernet hub 424 connects to the local NMS client 442 over a wireline connection 446. That hub 424 also connects to a router 426 that further connects to a modem 428, which, in turn, connects to the remote NMS client 442*a* over the modem link 446*a*. Further details of the NMS client 442 and NMS server 444 are set forth in U.S. patent application Ser. No. 09/026,487 designated as DSC Case No. 833-00 and Attorney Docket No. 24194000.179, entitled "Network Management System Server and Method for Operation," naming Scott D. Hoffpauir as inventor, which was filed concurrently with the instant patent application, and which is incorporated by reference herein for all purposes.

While the telecommunications system 400 of FIG. 4 is designed and constructed pursuant to the technical and functional specifications provided for in the current GSM standard, it should be appreciated and understood that the present invention should not be understood or construed to be so limited. Rather, the present invention is equally applicable to use with technologies and applications other than GSM, including, among others, PCS, CDMA and TDMA technologies, as well as those associated with wireline systems, such as tandem switching systems.

Figure 5:
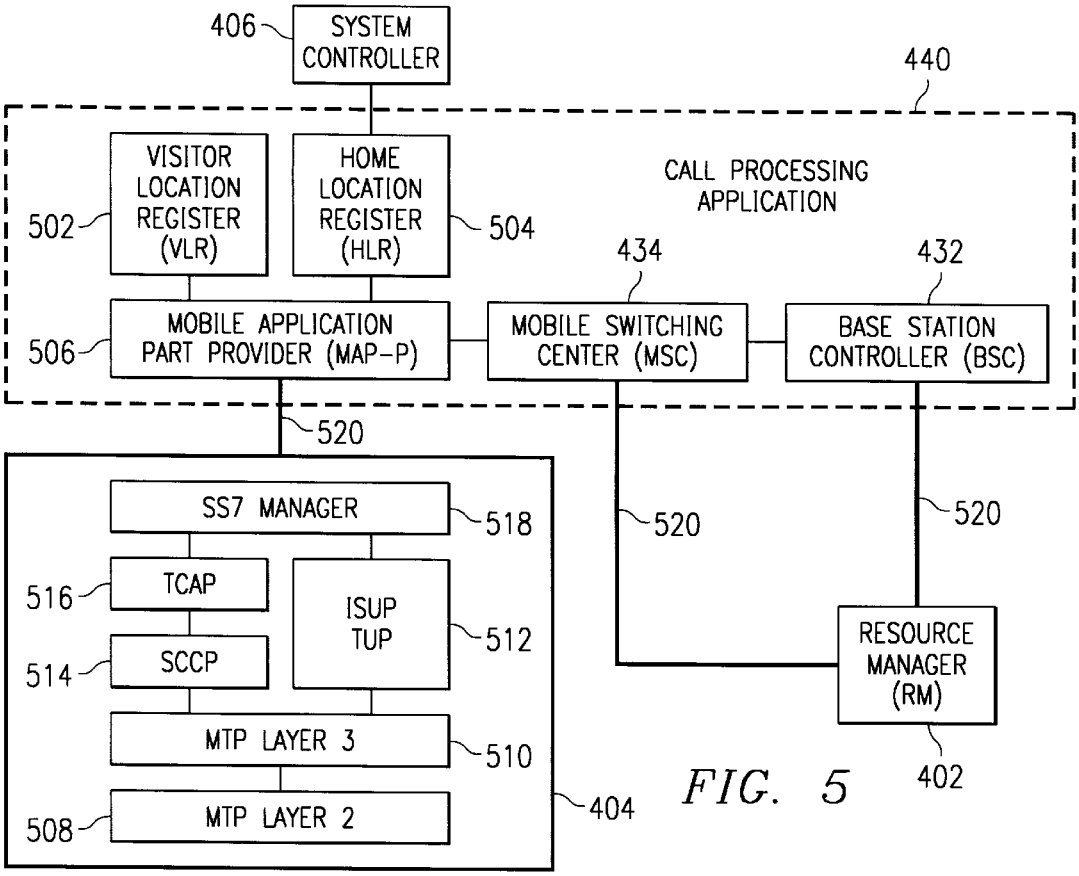
FIG. 5 is a diagram that illustrates various elements included within a call processor assembly, designed consistent with the GSM standard and in accordance with an exemplary embodiment of the present invention.

FIG. 5 illustrates various elements included within the call processor assembly 450, designed consistent with the GSM standard and in accordance with an exemplary embodiment of the present invention.

In addition to the base station controller 432 and mobile switching center 434, the call processing application 440 provides other elements that take part in processing calls directed to, or initiated by, the subscriber units 110. Specifically, the call processing application 440 includes a visitor location register 502 (abbreviated VLR), a home location register 504 (abbreviated HLR) and a mobile application part provider 506 (abbreviated MAP-P). Such elements are preferably implemented as distinct software entities.

Both the home location register 504 and the visitor location register 502 provide a database function for subscriber related information. Such subscriber related information includes subscription information for such subscribers, such as the service options to be provided to each subscriber (for example, voice mail, call waiting, call forwarding, etc.), preferences and option selections supplied by the subscribers (for example, call forwarding numbers or criteria), and the location of those subscribers. The home location register 504 provides that database function for certain set of subscribers, namely, those subscribers enrolled for service with the operator of the telecommunications system 400 or otherwise associated with the telecommunications system 400. In contrast, the visitor location register 502 provides a database function for those subscribers known to be situated in the area serviced by the telecommunications system 400 and its associated base transceiver stations 440. Those subscribers would therefore include roaming subscribers, i.e., subscribers associated with another service provider or telecommunications system for which subscriber related information is maintained externally but not in the home location register 504 of the telecommunications system 400. To obtain subscriber related information about a roaming subscriber, the visitor location register 502 of a telecommunications system 400 would therefore have to access the home location register of another operator or telecommunications system. Such access would, in turn, provide that external home location register with knowledge of the location of the roaming subscriber.

It is preferable to form distinct elements for the various elements provided for in the call processing application 440. By providing distinct elements, such as software entities, functionality is encapsulated and isolated from other elements, which allows for such elements to be readily modified, removed or interfaced with other elements.

SS7 type signaling is provided to the telecommunications system 400 as a transport mechanism for mobile application part dialogues and out-of-band signaling with other switches. That signaling includes several parts, each having a distinct protocol. Specifically, SS7 signals include: (a) a lower layer Message Transfer Part (abbreviated MTP), which applies to call related or non-call related signaling; (b) a Signaling Connection Control Part (abbreviated SCCP) and a Transaction Capabilities Application Part (abbreviated TCAP), which apply to non-call related signaling and (c) TUP and ISUP, which apply to call related signaling. The SS7 element 404 includes elements that correspond with the aforementioned parts, namely, a MTP Layer 2 element 508, a MTP Layer 3 element 510, and ISUP/TUP element 512, a SCCP element 514 and a TCAP element 516. Through these elements, the SS7 element 404 provides functionality related to each of those elements 508–516, including global title translations and terrestrial and satellite links.

The SS7 manager 518 provides for management and cooperation with respect to the other elements of the SS7 element 404 and other elements of the call processor assembly 450, such as the resource manager 402, the mobile application part provider 506 and the mobile switching center 434.

The mobile application part provider 506 is the logical link between the visitor location register 502 and home location register 504. As such, it is directly associated with the visitor location register 502 and the home location register 504 and provides the dialogues through which they communicate with each other and with other elements. The mobile application part provider 506 provides a protocol based on the services provided by the SS7 element 404 for non-call related signaling (specifically, TCAP) for use by other elements. The specific nature of the protocol provided by the mobile application part provider 506 is dependent on the identity of such elements, which is sometimes referred to as the MAP protocol interface. For example, messages between the visitor location register 502 and an external home location register utilize one MAP protocol interface while messages between the home location register 504 and an external visitor location register utilize another MAP protocol interface.

Preferably, authentication functions are integrated within the home location register 504 to provide authentication information to the home location register 504 for validating subscribers requesting service from the telecommunications system 400. Further details of mobile application part provider 506 are set forth in the U.S. patent application Ser. No. 09/026,230 designated by DSC Case No. 852-00 and Attorney Docket No. 24194000.197, entitled "Application Provider and Method for Communication," naming Scott D. Hoffpauir and Steve B. Liao as inventors, which was filed concurrently with the instant patent application, and which is incorporated by reference herein for all purposes.

The call processing application 440 is preferably implemented as a distinct software layer, such as an application layer 304 that is discussed above in connection with FIG. 3A. Further, each of the elements 432–434, 502–506 of the call processing application 440 are preferably implemented as distinct software entities. As such, virtual connections 520 are preferably formed between the base station controller 432 and the resource manager 448, as well as between a mobile switching center 434 and the resource manager 448 by employing object request broker technology and associated techniques. Likewise, virtual connections 520 are also preferably formed between the mobile application part provider 506 and the SS7 element 404.

Wireless telecommunications systems may employ various types of radio interface technology, such as, for example, TDMA, CDMA or FDMA technologies. TDMA technology allows for several subscriber units 110 to communicate simultaneously over a single radio carrier frequency by dividing a signal into time slots, which can be dedicated or dynamically assigned. Accordingly, TDMA systems have narrowband voice or traffic radio channels but can have wideband radio signals. Digital techniques are employed at base stations and in subscriber units 110 to subdivide time on each channel into timeslots. Like the above described GSM telecommunications system 400, systems that employ TDMA technology typically include, for example, a home location register, a visitor location register and a mobile switching center. Such TDMA systems may also include a radio controller, such as base station controller 434. Several standards have been created with respect to wireless telecommunications TDMA systems employing TDMA technology. Such standards include Interim Standard 54 (abbreviated IS-54) and Interim Standard 136 (abbreviated IS-136) by the Telecommunications Industry Association and the Electronic Industries Association, as well as the Global System for Mobile Communication (GSM) standard. Variants of the GSM standard, which also use TDMA technology, include the PCS-1900 standard for North America and the DSC-1800 standard. CDMA technologies typically divide the radio spectrum into wideband digital radio signals with each signal waveform carrying several different coded channels. Coded channels are each identified by a unique pseudo-random noise code. Digital receivers separate the channels by matching signals with the proper pseudo-random noise code sequence. Like the above described GSM telecommunications system 400, telecommunications systems that employ CDMA technology typically include, for example, a home location register, a visitor location register and a mobile switching center. Several standards presently exist with respect to wireless -telecommunications systems that employ CDMA technology, such as, for example, Interim Standard 95 (abbreviated IS-95), Interim Standard 41 (abbreviated IS-41) and Interim Standard 634 (abbreviated IS-634) by the Telecommunications Industry Association and Electronic Industries Association.

Operations carried out by the call processing application 440 preferably include substantially all of the functionality that is unique and specifically associated with a particular standard, such as the GSM standard. In doing so, and by implementing the call processor application 440 as a distinct software layer 302–310 having distinct software entities 312, such unique functionality is isolated and can be readily modified by adapting the software entities 312 found in the call processing application 440. Further, a given standard specific call processing application 440 can be readily replaced by another standard specific application.

For instance, a call processing application designed consistent with the GSM standard can be modified to provide, or replaced with, a call processing application consistent with the CDMA standard. Such modifications or replacements are facilitated by the provision of software entities 312 for the various elements that comprise the call processing application 440. As a specific example, consider the call processing application 440 of FIG. 4, which is designed consistent with the GSM standard and in accordance with an exemplary embodiment of the present invention. That call processing application 440 can readily be reconfigured to be consistent with the CDMA technologies and standards. Such modifications would require, for example, that the mobile application part provider 506, visitor location register 502 and home location register 504 be reconfigured to be consistent with the protocol specified by the IS-41 standard, and that the base station controller 432 be reconfigured to be consistent with the protocol specified by IS-634 standard, and certain other modifications. Corresponding changes would also likely be required with respect to configuration management element 408 and its associated client elements. No substantial modifications would be required to the resource assembly 202 or the software associated with it, such as the resource manager 448. Defined interfaces between the software entities 312 of the call processing application 440 and other software layers, which may be provided by an object request broker 314, would require only minor modifications.

Preferably, the use of agents within the mobile switching center 434 can facilitate the adaptability of the telecommunications system 400. As discussed below in connection with FIG. 8, a call processing architecture may be employed that provides for agent groups and associated agents to terminate and originate call connections consistent with a given access technology or standard. However, as discussed below in connection with FIG. 9, a call processing architecture may be employed that provides for agent groups and associated agents to terminate and originate call connections consistent with more than one access technology or standard.

Figure 6:
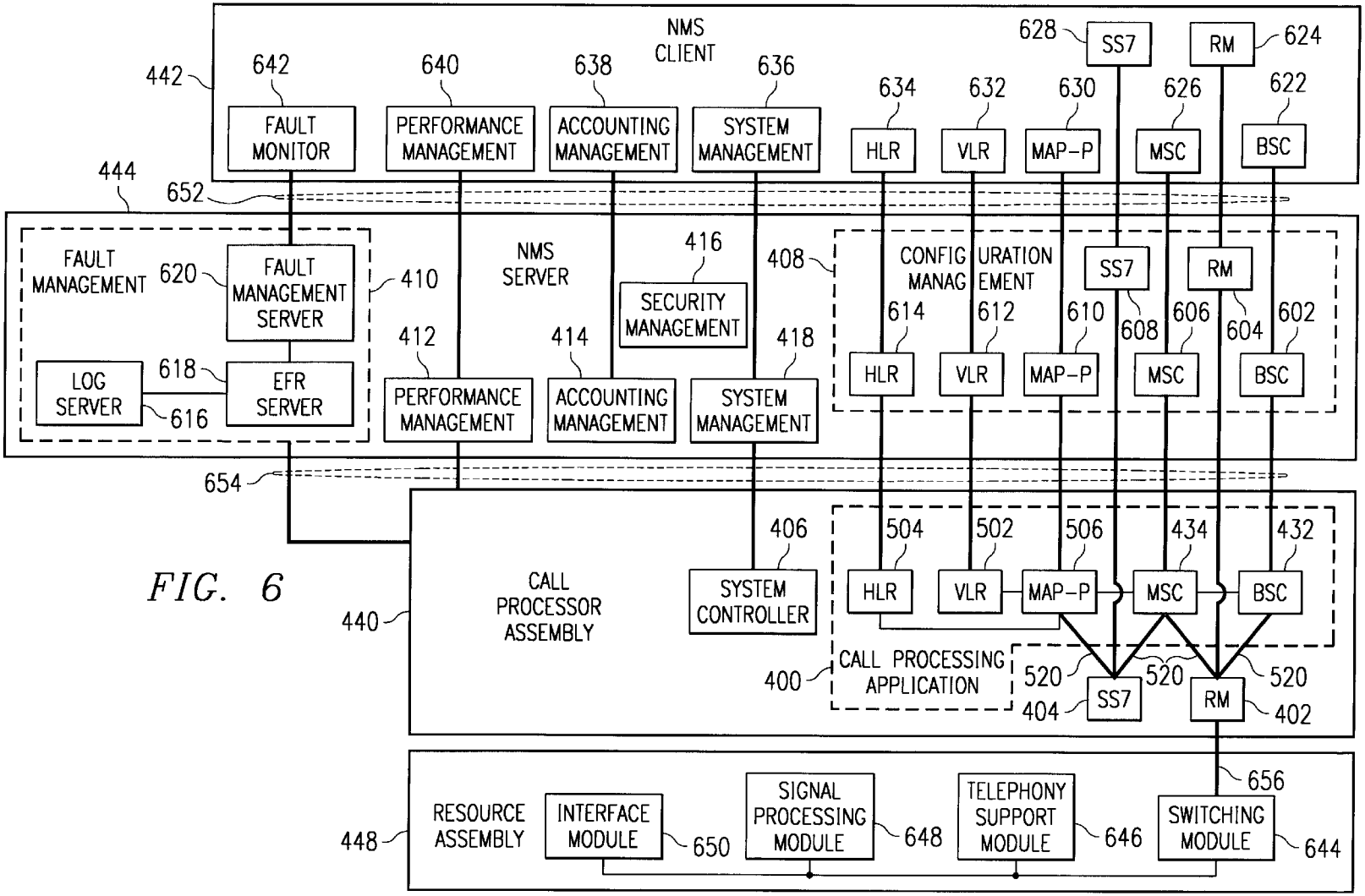
FIG. 6 is a diagram that more specifically illustrates the various elements and resources, and connections provided therebetween, of a telecommunications system, designed consistent with the GSM standard and in accordance with an exemplary embodiment of the present invention.

FIG. 6 more specifically illustrates various elements of the NMS client 442 and NMS server 444 and resources of the resource assembly 448, designed consistent with the GSM standard and in accordance with an exemplary embodiment of the present invention.

As illustrated in FIG. 6, the resource assembly 448 preferably includes a switching module 644, a telephony support module 646, a signal processing module 648 and an interface module 650. Each of those modules preferably include software and communicate with the resource manager 402 of the call processor assembly 450. As discussed more fully with respect to FIG. 7, each of those modules 644–650 preferably include specific resources that can be employed by the call processor assembly 450. Alternatively, specific resources may be distributed amongst the various modules 420. It should therefore be recognized and appreciated that the allocation of resources within the resource assembly 448 is not pertinent to the scope of the present invention.

The software architecture of the telecommunications system 400 is preferably based on object oriented software engineering technology, and the use of managed objects provided within the network management system 204. Managed objects are provided to support system logical attributes and administrative functions. Managed objects model the various functional, hardware, and interface components and sub-components associated with the telecommunications system 400. Such software may also model the functional procedures performed by physical components. Managed objects can be created, modified, and deleted by an operator.

Preferably, the NMS server 444 includes a set of elements, which contain managed objects, that communicate with corresponding set of elements of the NMS client 442. Operators of the NMS client 442 can cause the retrieval and display of a managed object of the NMS server 444, which can then be modified by the operator. Elements of the NMS server 444 and NMS client 422, which are discussed more fully below, are preferably implemented as software entities.

There is provided elements resident within the NMS server 444 and the NMS client 442 that correspond to those functional elements provided in the call processing application 440, as well as the resource manager 402 and the SS7 element 404. Namely, the configuration management element 408 of the NMS server 444 preferably includes a BSC server 602, a RM server 604, a MSC server 606, a SS7 server 608, a MAP-P server 610, a VLR server 612 and a HLR server 614. Similarly, the NMS client 442 preferably includes a BSC client 622, a RM client 624, a MSC client 626, a SS7 client 628, a MAP-P client 630, a VLR client 632 and a HLR client 634. Such NMS client elements 622–634 are operable to provide a graphical user interface to, and receive configuration information from, an operator with respect to the associated elements of the call processor assembly 450. Such NMS server elements 602–614 are responsible for validating and storing the configuration information from such NMS client elements 622–634 for use by elements of the call processor assembly 450.

For example, an operator can make changes to reflect the addition or removal of hardware components or modifications to their operational parameters, changes to reflect the addition or removal of subscribers and to subscriber service profiles, and modify translation tables of the mobile switching center 434. Changes made by an operator are sent to the appropriate server elements of the NMS server 444 which, in turn, update local data base, notify all peer elements of the call processing application 408 of those changes, and report the completion status of the change request to the operator.

The system management server 418 of the NMS server 442 supports the start-up and recovery functions of the telecommunications system. Preferably, it is responsible for the sequential, automatic start-up of other NMS server elements by reading system start-up files and periodically polling such elements to verify their operational status and automatically restarting failed elements. It periodically requests that functional elements of the telecommunications system 400 update their stored configuration files to support system recovery. This ensures the availability of start-up files that will allow the system processors to restart at a known configuration state following a shutdown or reset. The system management client 636 of the NMS client 442 provides an operator with a list of elements residing in the telecommunications system 400, the software version and status of such elements. The operator is also provided with the ability to start, stop or query the status of individual servers through that client element 636.

The security management server 416 is preferably responsible for validating operator log-in information and restricting access to certain operations based on the operator's access class. It may also be responsible for management of user identification, passwords, and access levels.

An accounting management server 414 and a corresponding accounting management client 638 are preferably respectively provided within the NMS client 442 and NMS server 444. Billing records, in the form of call data records, are reported from the accounting management server 414, which stores those records on a database associated with the NMS server 444. Such billing records may also be transferred from the accounting management server 414 to the accounting management client 638 for storage with an associated memory.

A performance management server 412 and a corresponding performance management client 640 are preferably respectively provided in the NMS client 442 and the NMS server 444. The performance management server element 412 polls the call processing application 440 for function-specific performance measurements, and generates reports and statistics based on those measurements. Such reports and statistics may be presented for display by the performance management client 640.

Alarms and fault-related events are routed from an event filtering and reporting (abbreviated EFR) server 618 to the NMS client 442 for display and to the log server 616 for storage and later processing. The NMS client 442 includes a filtering and reporting mechanism, the fault monitor 642, that allows an operator to tailor alarm, event, and state change reporting to meet specific needs.

The fault monitor 642 includes browsers that provide one or more operators with current alarm, event, alarm and state change information and maintains a consistent view of network alarm conditions. Real-time notifications are forwarded to the fault monitor from the EFR server 618. An operator has the ability to filter these notifications (messages) based on their type and severity level.

The EFR server 618 provides common services that support various elements of the NMS client. The EFR server 618 receives real-time event notifications, such as alarms, test results and billing records, generated by the call processor assembly 450 and resource assembly and other elements of the NMS server 444. The EFR server 618 is operable to filter them, and then route them to certain destinations within the telecommunications system 400.

The log control server 616 is responsible for logging functions. As such, it receives various alarm, event, and state change notifications from the EFR server 618 and stores the information to a database associated with the NMS client 442.

The call processing application 440, the NMS client 442 and the NMS server 444 are preferably implemented as distinct software layers. Further, the NMS client elements 622–634, performance management server 412, accounting management server 414, security management server 416, system management server 418, system controller 406, SS7 element 404, resource manager 448, elements provided in the call processing application 440, as well as the configuration management 408 and fault management 410 elements, are preferably implemented as software entities. As such, virtual connections 652 are preferably formed between the software entities of the NMS client 442 and corresponding software entities of the NMS server 444 by employing object request broker technology and associated techniques. Similarly, virtual connections 654 are preferably formed between software entities of the configuration management element 408 and corresponding software entities of the call processing application 440, between the system management 418 and system controller 406 elements, as well as between the EFR server 618 and performance management server 412 and various software entities of the call processor assembly 450. Virtual connections 656 are also preferably formed between the resource manager 448 and various software entities of the resource assembly 448.

Figure 7:
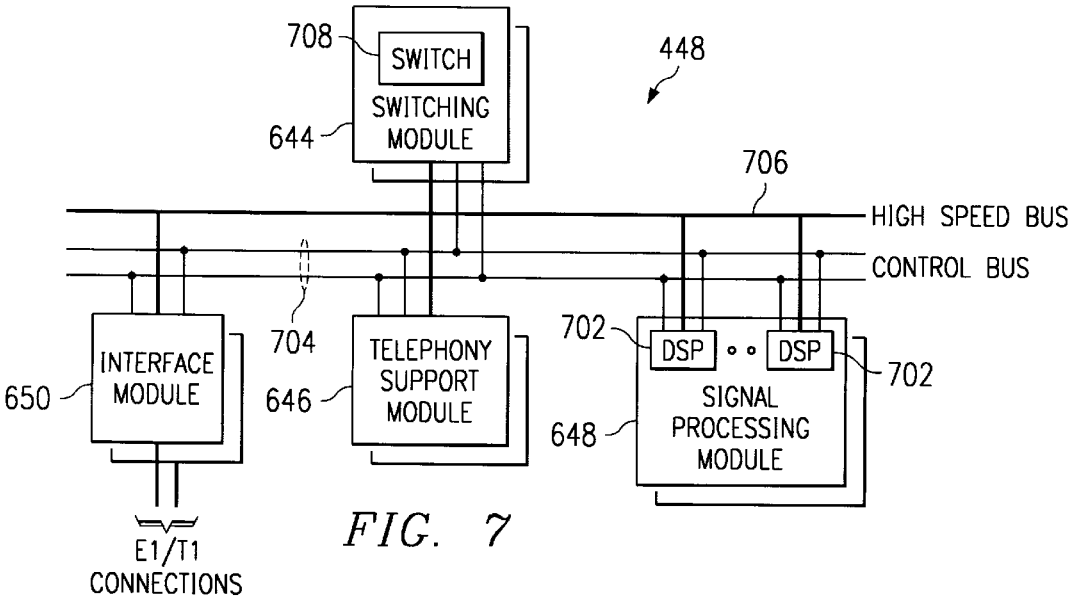
FIG. 7 is a diagram that illustrates various modules of a resource assembly, designed consistent with the GSM standard and in accordance with an exemplary embodiment of the present invention.

FIG. 7 illustrates various modules 420 of the resource assembly 448, designed consistent with the GSM standard and in accordance with an exemplary embodiment of the present invention. In accordance with an exemplary embodiment, one or more switching modules 644, interface modules 650, telephony support modules 646 and signal processing modules 648 are provided within a resource assembly 448. The interface modules 650, signal processing modules 648 and telephony support modules 646 are coupled through one or more of the switching modules 644. Control information is provided by a switching module 644 to other modules over the redundant control bus 704. Data is provided by a switching module 644 to other modules over a high speed bus 706.

A switching module 644 may be implemented in software, hardware or a suitable combination of software and hardware. A switching module 644 preferably performs switching operations, clock operations, and local communications between resources of the resource assembly 448 of the telecommunications system 400. These operations may be performed using pulse code modulation switching and data transfer techniques, Link Access Protocol on the D Channel (abbreviated LAP-D) communications and ethernet interface communications.

A switch 708 preferably resides within a switching module 644 to perform the switching functions and operations. That switch 708 may be a timeslot switch having a memory timeslot matrix to make required timeslot cross-connections within the telecommunications system 400. The switch 708 functions to set up and tear down both simplex and duplex connections between two specified channels, which may represent a call or other useful connections. For example, the switch 708 may cause a channel to connect a channel (provided by, for example, a base transceiver station 440 or a switched network 106) to a call progress tone or a voice announcement.

Further, the switch 708 should be operable to set up system defined connections upon power up and reset as well as connections for the testing of timeslots when not in use.

Timeslots are preferably provided to the timeslot switch via the high speed bus 706.

A switching module 644 may also, for example, include suitable digital data processing devices, a processor, random access memory and other devices. Preferably, each switching module 644 runs a suitable operating system, and include one or more pulse code modulation bus interfaces, one or more High Level Data Link Controller (abbreviated HDLC) control bus interfaces, one or more ethernet interfaces, and an arbitration bus interface to other switching modules 644.

A telephony support module 646 may be implemented in software, hardware or a suitable combination of software and hardware. A telephony support module 646 may, for example, provide tone generation, digit transceiver functions, and digitized announcements for the telecommunications system 400. Telephony support modules 646 may also provide call setup functions, such as digit collection and out-pulsing, and call completion functions, such as digitized announcement generation and call supervisory tone generation. A telephony support module 646 may, for example, include suitable telecommunications data processing equipment, such as a processor, random access memory, one or more redundant High Level Data Link Controller bus interfaces, one or more pulse code modulation buses, and an arbitration bus for establishing active telephony support module 646 status. Preferably, a single telephony support module 646 provides all required functionality for the telecommunications system 400, and one or more additional telephony support modules 646 are used to provide redundancy in the event of component failure.

An interface module 650 is an interface device that is used to interface a suitable number of telecommunications lines that carry data in a predetermined format, such as an E1 data format, with the telecommunications system 400. Interface modules 650 provide the physical interface between the telecommunications system 400 and other equipment, a switched network 106 and base transceiver stations 440. Interface modules 650 also support in-band trunk signaling for DSO data channels that are configured for channel associated signaling, and transmit data to and receive data from a signal processing module 648. An interface module 650 may be implemented in software, hardware or a suitable combination of software and hardware. For example, an interface module 650 may include suitable data processing equipment, such as a processor, random access memory, up to four E1 ports, redundant High Level Data Link Controller bus interfaces, and pulse code modulation bus interfaces.

A signal processing module 648 is preferably used to provide an interface between a call processor assembly 450 and a signaling system. For example, signaling data may be received from a data transmission channel from the switched network 106, and may be switched to another data transmission channel, such as an E1 telecommunications channel, from an interface module 650 to a signal processing module 648 by a switching module 644. A signal processing module 648 is also preferably employed to perform transcoding and rate adaption functions, such as converting from a wireless system speech encoding format to a pulse code modulation data format, as well as other functions, such as echo cancellation functions. For example, signal processing modules 648 may be employed by telecommunications system 400 to convert data from the GSM data format to another format, such as the pulse code modulation data format.

One or more digital signal processors (abbreviated DSP) 702 are preferably provided within the signal processing module 648. A multi-channel transcoder rate adapter unit 308 is preferably implemented in a digital signal processor 702. That is, one or more digital signal processors 702 preferably incorporate functions associated with the transcoder rate adapter unit 308. Such digital signal processors 702 preferably include multiple input and output buffers for storing multiple channel audio data, and perform rate adaption through an interrupt-driven routine that places the appropriate channel data onto both the near-end and far-end transmission lines at the appropriate data rate. With the implementation of rate adaption, such digital signal processors 702 also has further processing power available to perform encoding and decoding of the incoming audio data. In addition to functions associated with the transcoder rate adapter 308, an echo-cancellation capability may be advantageously provided by the digital signal processors 702 by utilizing the already robust voice activity detection bits produced in transcoding a signal. An example of a single digital signal processor 702 that provides transcoding, rate adaption, and echo-cancellation functions, and using an improved decoding process, is disclosed in U.S. patent application Ser. No. 08/678,254, now U.S. Pat. No. 5,835,486, entitled "Multi-Channel Transcoder Rate Adapter Having Low Delay and Integral Echo Cancellation," naming James M. Davis and James D. Pruett as inventors, filed Jul. 11, 1996, and which is incorporated by reference herein for all purposes.

An E1 or T1 transmission line providing a 16,000 bits per second signal, which may carry four traffic channels, may be coupled to an interface module 650. That signal may, in turn, be connected to a digital signal processor 702 over a high speed bus 706. A digital signal processor 702 is further connected to a 64,000 bits per second transmission line also capable of carrying, for example, four traffic channels. The 64,000 bits per second transmission line can be, for example, a 64,000 bits per second PCM line. These lines are functionally bi-directional; each transmission line is connected to both an input and output of the digital signal processor 702. A digital signal processor 702 may be further connected via an address bus, a data bus, and a control bus to at least one random access memory and at least one read only memory device, in a conventional manner. A digital signal processor 702 used in this exemplary embodiment can be, for example, an Analog Devices 2106x digital signal processor chip.

A signal processing module 648 may be implemented in software, hardware or a suitable combination of software and hardware. In addition to one or more digital signal processors 702, a signal processing module 648 may include suitable data processing equipment, such as a processor, random access memory, four daughter board module ports, redundant High Level Data Link Controller bus interfaces, pulse code modulation matrix bus interfaces and other signal processing application hardware.

In operation, a subscriber unit 110 may attempt to place a call using the telecommunications system 400 by the following procedures. Signaling data and other call control data is received from a base transceiver station 440 in an E1 data format at an interface module 650. That data is then switched through a switching module 644 to a telephony support module 646, which performs call setup functions. A call processor assembly 450 receives the signaling data, and determines the call destination. Depending upon the call destination, the call processor assembly 450 sends signaling and call control data to the switched network 106, another telecommunications system, or a base transceiver station 440 serviced by the telecommunications system 400. If a telecommunications channel cannot be established, a busy signal, a no answer message, or another appropriate response is generated by the telephony support module 646, and the call attempt is terminated. If a telecommunications channel can be established, the call processor assembly 450 configures the switching module 644, telephony support module 646, interface modules 650, and signal processing module 648 to process the call data. A similar process is also used to handle incoming telecommunications channels from other telecommunications switches or the switched network 106, or to de-allocate elements of the telecommunications system 400 after the call is completed.

Figure 8:
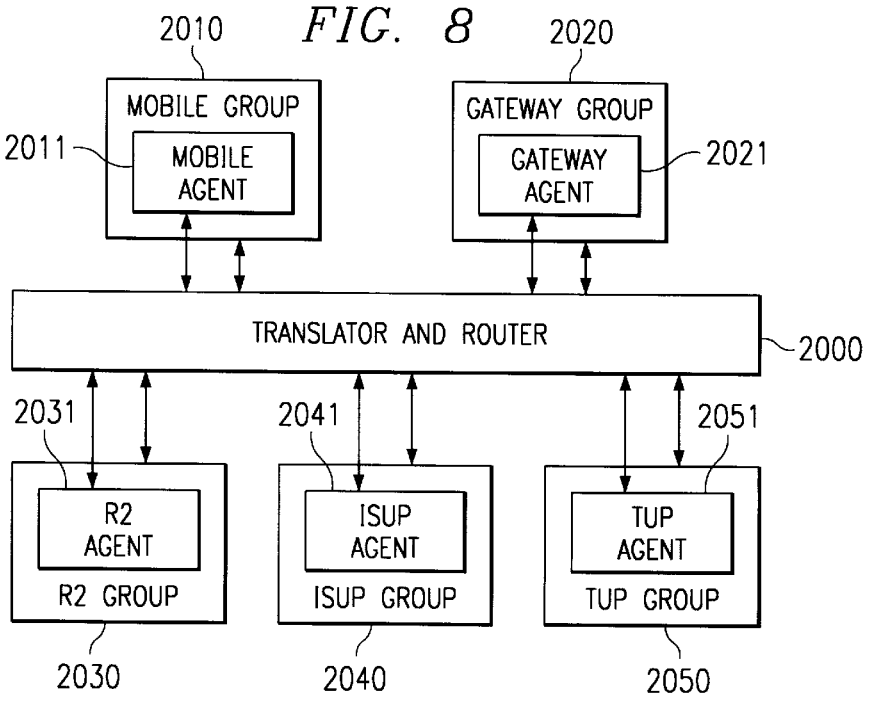
FIG. 8 illustrates agents connected to a translator and router according to an exemplary embodiment of the present invention.

FIG. 8 illustrates agent groups 2010–2050 connected to a translator and router 2000, in accordance with an exemplary embodiment of the present invention. As shown in FIG. 8, agent groups 2010–2050 include, for example, mobile connection group 2010, gateway group 2020, R2 group 2030, ISUP group 2040 and TUP group 2050. R2 group 2030, ISUP group 2040 and TUP group 2050 can also be referred to as trunk groups. Each group includes agents with the same characteristics. For example, the mobile connection group 2010 includes mobile agents 2011 so that there is a mobile agent 2011 for each dedicated connection between a subscriber terminal 110 and the mobile network (e.g., one agent represents one call half). Similarly, gateway group 2020 includes gateway agents 2021, R2 group 2030 includes R2 agents 2031, ISUP group 2040 includes ISUP agents 2041 and TUP group 2050 includes TUP agents 2051. Agent groups could also be provided for any other desired operation, such as, for example, loop backs (e.g., for testing), test tones, test announcements and record announcements.

According to an exemplary embodiment of the present invention, the following call processing architecture is used to build a call, e.g., establish a call connection. With reference to FIGS. 1 and 8, a call is originated on a mobile network 104, switched network 106 or by a subscriber terminal 110. The call is initiated by, for example, the calling party entering the dialed digits for the called party. The call connection is established by connecting a protocol (e.g., state) machine for the calling party (e.g., a mobile switching center for a mobile network or a switching center for a switched network) with a protocol machine for the called party. According to an exemplary embodiment of the present invention, the call connection is treated as having two halves—an originating half and a terminating half. Each call half is associated with an agent group and an agent of the agent group.

Agent groups and agents are illustrated in FIG. 8. An agent, such as a mobile agent 2011 or an ISUP agent 2041 is, for example, a software entity that provides a call state machine for a particular call type (e.g., mobile, ISUP or R2). Each agent, which can function as an originating agent, a terminating agent or both, has, for example, an external interface and an internal interface. The internal interface provides the ability to communicate with another agent or elements of the telecommunications system while the external interface allows communication using the native protocol call messages for the particular call type (e.g., mobile, ISUP, R2, etc.). Thus, the internal interface of each agent includes the capability to convert between the native protocol call message format and the call message format of other agents. An agent could also include the capability of converting between its unique signaling format (e.g., native protocol) and a standard format as described in detail below regarding an agent interworking protocol according to an exemplary embodiment of the present invention. The functions performed by each agent include, for example, call setup, call processing and call termination. An agent group is also, for example, a software entity that represents a collection of agents of the same type, as illustrated in FIG. 8. As explained in more detail below, an agent group has its own behavior which includes, for example, selecting agents for establishing call connections when requested and registering the agent group with a translator and router so that the agent group can be used to route calls, also as described below.

In an exemplary embodiment of the present invention, agents follow a set of basic rules in establishing a call connection. For example, each agent interacts with a translator and router to process the dialed digits for a call (generally referred to as translation, although modification of the dialed digits is not always required) and determine a route for establishing a connection with a terminating agent. According to an exemplary embodiment of the present invention, a translator and router, for example indicated as 2000 in FIG. 8, helps isolate an originating agent (e.g., the agent handling the originating half of the call) from the responsibilities of obtaining a terminating agent (e.g., the agent handling the terminating half of the call). The translator and router 2000 facilitates the selection of a terminating agent via interaction with the originating agent. For example, upon receipt of the dialed digits, the originating agent can make a translation request to the translator and router 2000 to perform any processing of the dialed digits required by the telecommunications system. Another request can be made by the originating agent to the translator and router 2000 that the processed digits be used to identify a route for completing the call connection. Thus, the translator and router 2000 can use the processed digits to determine a route by, for example, determining the agent group associated with the processed dialed digits and requesting that the agent group identify an idle agent to serve as a terminating agent for the call, an ID being provided to the originating agent and the terminating agent to identify a connection path between the originating and terminating agents.

Thus, in the call processing architecture according to an exemplary embodiment of the present invention, upon a call attempt, an originating agent is preferably allocated by a switching center of the telecommunication system and the originating agent receives the dialed digits via its external interface. The originating agent then sends a translate request to a translator and router and in response receives an acknowledgment message and the results of the request (e.g., the processed dialed digits). The processed dialed digits are generated, for example, via translation tables in the translator and router 2000, which are described in more detail below. The originating agent then sends a route request to the translator and router along with the processed dialed digits and a connector ID. The connector ID represents, for example, a software entity for a communication path between the originating and terminating agents. In response to the route request, the translator and router 2000 determines a route (e.g., the agent group for the terminating agent) via, for example, a routing table in the translator and router 2000, described in more detail below.

The translator and router 2000 then sends a request to the identified agent group that an idle agent be identified for completing the call connection. The connector ID from the originating agent is also provided to the agent group identifying a connection path between the originating and terminating agents. While the connector ID is determined by the originating agent, the translator and router or the terminating agent could also allocate the connector ID. The agent group polls its pool of agents and if an idle agent is found, an acknowledgment message is returned to the translator and router and also forwarded to the originating agent. The connector ID is provided to the terminating agent by the terminating agent group. Thus, the originating agent can now complete its connection with the terminating agent to allow dialogue between the agents and also tear down of the call connection at termination of the call via the allocated connection path. If the terminating agent determines that the call needs another type of agent (e.g., due to redirection, call forwarding, etc.), the terminating agent can also act as an originating agent and, through the same actions described above, interact with the translator and router to identify the next agent needed to process the call, all of the agents being connected until the call is setup. Thus, the call processing architecture according to the present invention allows call connections to be built by connecting agents for each half of a call connection, allowing multiple agents to be connected together if necessary until the call connection is established.

In an exemplary embodiment of the present invention, mobile agents 2011 are responsible for establishing a mobile originated or mobile terminating connection between the mobile switching center 434 and a subscriber terminal 110. Accordingly, mobile agents 2011 communicate with the Mobile Application Part (MAP) protocol which addresses registration and hand-off of subscriber terminals. Mobile agents 2011 are also responsible for interworking with a second agent in the role of call originator or terminator. R2 agents 2031 are responsible for establishing a connection between the mobile switching center 434 and a switched network 106 using the R2 protocol and also interworking with another agent in the role of call originator or terminator. Gateway agents 2021 are responsible for routing calls destined for subscriber terminals 110 (e.g., mobile network calls). For example, if the destination subscriber terminal 110 is visiting the gateway agent's switching center, the call will be routed to a mobile agent 2011. However, if the destination subscriber terminal 110 is currently visiting a switching center other than the gateway agent's switching center, then the call will be routed to a trunk agent, such as a R2 agent 2031, ISUP agent 2041 or TUP agent 2051 to connect the call to the mobile network servicing the destination subscriber terminal 110. ISUP agents 2041 are responsible for establishing a connection between the mobile switching center 434 and the switched network 106 using, for example, the ITU White Book ISUP protocol or the ETSI V2 ISUP protocol and also interworking with another agent in the role of call originator or terminator.

Like the agents 2011–2051 which are implemented as software objects in the mobile switching center 434, the translator and router 2000 can also be implemented in software in the mobile switching center 434, for example as a software object. The translator and router 2000 manages all the call translations and routing functions for the agents. As is known in the art, when a subscriber terminal 110 originates a call, the subscriber terminal's dialed number is transferred, as it is dialed, to the telecommunications system 100. A translation process, implemented in the translation and router 2000, converts the dialed number into a generically formatted telephone number. The translation process may include, for example, the prefixing of (e.g., stripping off) area code, long distance or international codes, conversion of service codes (e.g., 411 or 911) into telephone numbers or any other mapping/formatting action decided by the operator of the telecommunication system 100. The dialed number may also pass untranslated through the translator and router 2000. After translation, the router function of the translator and router 2000 routes the translated number towards the correct destination. The router function utilizes routing tables to map a translated number to a route list that contains an ordered list of routes. Routes correspond to agent groups, for example, trunk group names, subscriber terminal terminations, call delivery features or test circuits. The destination may be, for example, a specific outgoing trunk group directed to a switched network 106 or to a voice mail system or to another subscriber terminal 110 serviced by the telecommunications system 100. For a call terminating at a subscriber terminal 110, once the call arrives at the mobile switching center 434 servicing the subscriber terminal 110, no translation or routing is necessary and the call is set up to the subscriber terminal 110.

The translator and router 2000 includes, for example, a translator subtable with translator entries and a router subtable with router entries. Translation and routing tables are generally different for each type of agent, e.g., each agent group and its associated agents utilize particular translation and routing tables distinct from the tables utilized by other agent groups. The translation and routing tables function to check received digits in a number, to modify received digits when required, and to select available routing agents to connect a call. The table can be, for example, subfunctions of a Translator/Router object model for an object oriented implementation of the translator and router 2000 in the mobile switching center 434.

A translator subtable represents a table of translator entries and is used for manipulating incoming or outgoing digits. For example, number translation tables can contain entries to strip prefix digits (e.g., 0, 1, 01 or 011) from a number, append an area code to a local directory number or map a service code (e.g., 411 or 911) to a local number. Incoming translation tables modify digits to obtain a pattern that will be recognized by the routing function, thus allowing selection of an agent to connect the call. Outgoing translation tables apply to trunk groups only and modify digits to obtain a pattern that will be compatible with the receive digits register in the destination switch. For example, if a destination switch requires a number in a specific format, then outgoing translations can be used to manipulate the number before it is sent to the destination switch. Thus, if the destination exchange requires 1+10 digits, the outgoing translation tables can be used to prefix the "1" in front of the 10 digits.

A translation subtable contains, for example, one or more translation entries, each entry being composed of a MATCH digit pattern and a MODIFY digit pattern. The match pattern is used to match the digits to translate. If a match occurs, then the digits are modified based on the modify pattern. If no match occurs, then the received digits are used and passed on to the router function. The router subtable represents a table of router entries and is used for routing an incoming call. A route subtable contains, for example, one or more routing entries, each entry being composed of a MATCH digit pattern and a ROUTE LIST. The ROUTE LIST identifies one or more agent group names, as described below. Thus, each router entry represents a MATCH digit pattern used to match the processed dialed digits from the translation to the route (e.g., the agent group) which processes the called number. An exemplary translation table and routing table are shown below.

Translation Table

| | MATCH | MODIFY |
|---|---|---|
| ENTRY1 | 0???????? | 901???????? |
| ENTRY2 | 1???????? | 901???????? |
| ENTRY3 | 0??????????? | ??????????? |
| ENTRY4 | 1??????????? | ??????????? |

Routing Table

| | MATCH | ROUTE LIST |
|---|---|---|
| ENTRY1 | 901???????? | TRKGRP1 |
| ENTRY2 | 902???????? | TRKGRP2 |
| ENTRY3 | 7727555555 | GSM |
| ENTRY4 | ?????????? | TRKGRP1 TRKGRP2 |

Figure 9:
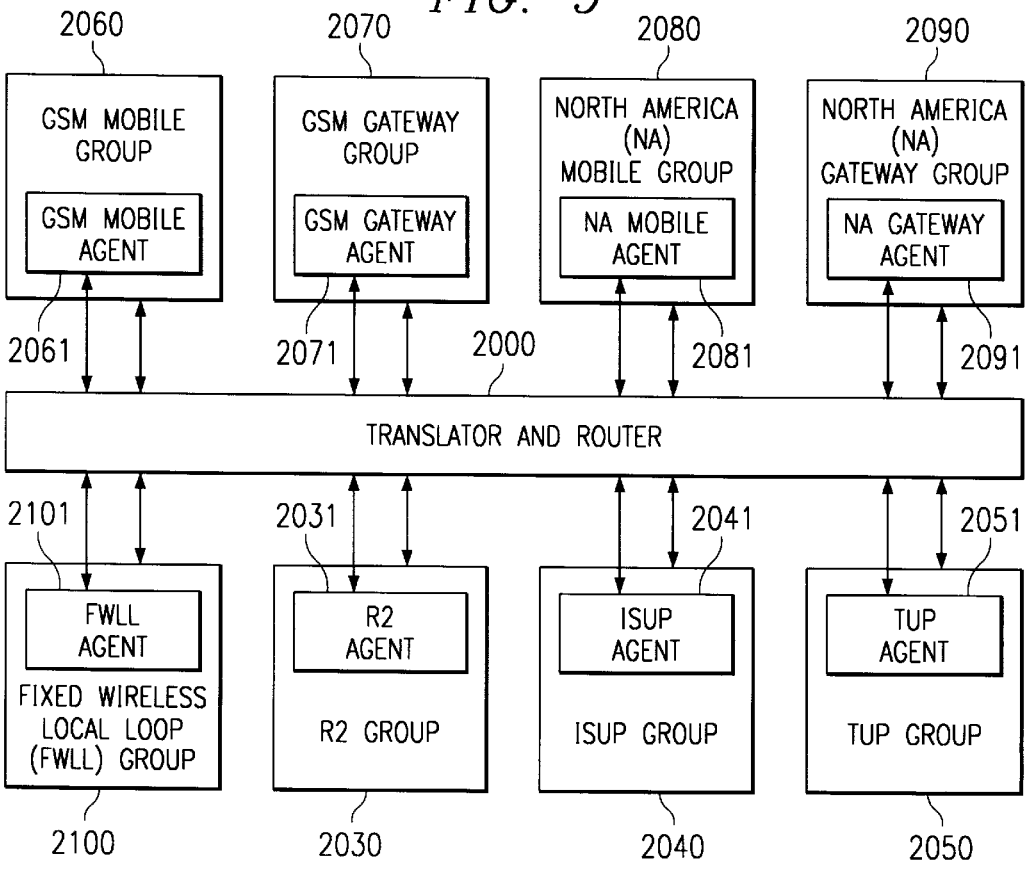
FIG. 9 illustrates exemplary agents connected to a translator and router according to an exemplary exemplary embodiment of the present invention.

FIG. 9 illustrates a call processing architecture having agent groups 2010–2100 connected to a translator and router 2000, in accordance with an exemplary embodiment of the present invention. As illustrated in FIG. 9, a GSM mobile group, a GSM gateway group 2070, a North American (abbreviated NA) mobile group 2080, a NA gateway group 2070, and a Fixed Wireless Local Loop (abbreviated FWLL) group 2100 are provided in connection with the translator and router 2000. Those groups include corresponding agents, namely, a GSM mobile agent 2061, a GSM gateway agent 2071, a NA agent 2081, a NA gateway group 2091, and a FWLL agent 2101 (abbreviated FWLL). The GSM mobile group 2060 and its associated GSM agents 2061, as well as the GSM gateway group 2070 and its associated agents 2071, are configured with respect to calls directed to or originating from subscriber units 110 that employ GSM based technology. Similarly, the NA mobile group 2080 and its associated NA agents 2081, as well as the NA gateway group 2090 and its associated agents 2091, are configured with respect to calls directed to or originating from subscriber units 110 that employ various North American access technology. The NA mobile agents 2081 may, for example, be configured to operate consistent with the Interim Standard 634 (abbreviated IS-634 ) by the Telecommunications Industry Association and the Electronics Industries Association, e.g., the agents support call messaging consistent with the IS-634 standard. The IS-634 standard provides for a standard protocol used for communications between a mobile switching center and base stations 102. Compliance with the IS-634 standard requires compliance with other standards, such as various CDMA standards, the IS-136 TDMA standard, and AMPS based standards. Further, the NA gateway agents 2091 may, for example, be configured to operate consistent with the Interim Standard 41 (abbreviated IS-41) by the Telecommunications Industry Association and the Electronics Industries Association. The FWLL group 2100 and its associated FWLL agents 2101 are configured with respect to calls directed to or originating from subscriber units 110 that employ FWLL based technology. For example, the FWLL agents 2101 may be configured to operate consistent with a specific FWLL standard, such as V5.2.

By providing diverse agents, the telecommunications system 100 allows for calls that originate in accordance with one particular access technology, standard or protocol to be terminated using another access technology, standard or protocol, without resort to another telecommunications system. For example, a GSM mobile agent 2061 and/or a GSM gateway agent 2071 may process a GSM originated call and a NA mobile agent 2081 and/or a NA gateway agent 2091 may process a CDMA terminated call, or vice versa. Numerous other exemplary combinations may be provided, such as GSM-AMPS, AMPS-CDMA, FWLL-AMPS, AMPS-FWLL, etc.

Figure 10:
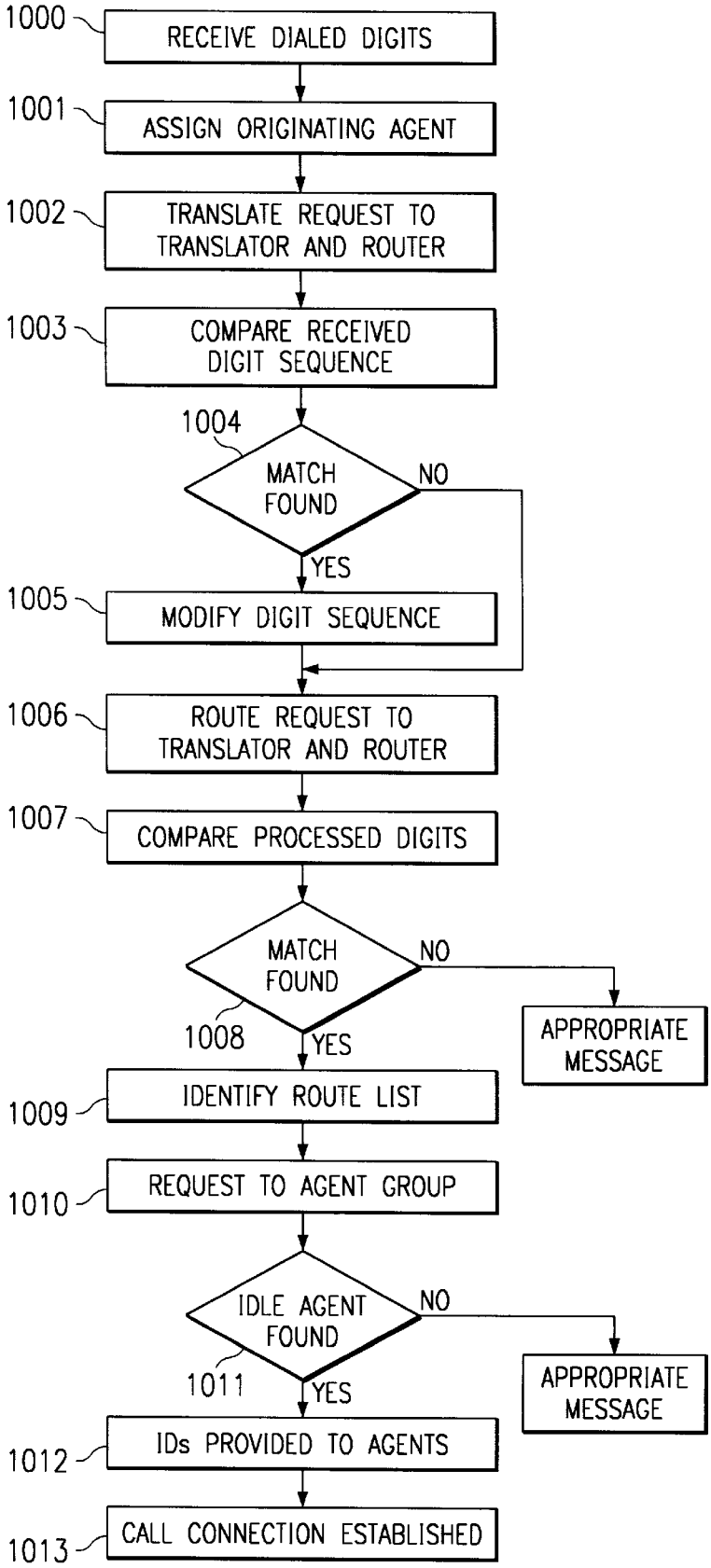
FIGS. 10½ and 10⅔ illustrate an exemplary flow chart of call processing according to an exemplary embodiment of the present invention.
Figure 11:
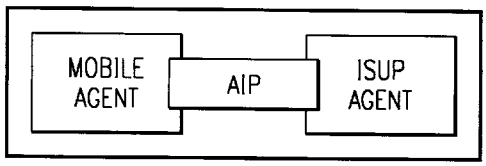
FIG. 11 illustrates exemplary agent connections using an agent interworking protocol according to an exemplary embodiment of the present invention.

FIG. 10 illustrates an exemplary flow diagram of a call processing architecture in accordance with an exemplary embodiment of the present invention. A switching center of a telecommunications network such as a mobile switching center 434 receives a digit sequence from a calling party in step 1000 and an originating agent is assigned in step 1001. Depending on the originating location of the call, (e.g., PLMN or PSTN) the assigned agent could be, for example, a mobile agent 2011, an ISUP agent 2041 or an R2 agent 2031. A translation request is made by the originating agent to a translator and router in step 1002. The received digit sequence is translated by use of, for example, an incoming translation index in the translator and router of the mobile switching center 434 in steps 1003–1005. The incoming translation index (e.g., translation table) includes one or more entries, each entry of the incoming translation index including a digit pattern, which is compared and matched to the dialed digit sequence, and a corresponding modified digit pattern, which is used to modify the dialed digit sequence. The incoming translation index first compares the received dialed digit sequence with the various digit pattern entries at step 1003. The incoming translation index then determines whether the received digit sequence matches a digit pattern included in an entry of the incoming translation index at step 1004. If there is a match, then the received digit sequence is modified in accordance with the corresponding modified digit pattern (that is, the modified digit pattern of the entry that included the digit pattern which matched the received digit sequence), at step 1005. If there is no match, however, then the received digit pattern is not modified.

The processed dialed digits are returned to the originating agent, whether or not modified by the incoming translation index, and then a route request is made by the originating agent to the translator and router in step 1006. A route translation index (e.g., routing table) in the translator and router includes one or more entries, each entry of the incoming translation index including a digit pattern, which is compared and matched to the processed digit sequence, and a corresponding route list, which is used to route the call within the telecommunications system 100. Like the incoming translation index, the incoming route index first compares the processed digit pattern, whether modified or not, with the various entries contained in that route index at step 1007. The incoming route index then determines whether the received digit sequence matches a digit pattern of an entry of the incoming route index at step 1008. If there is a match, then the route list corresponding with that digit pattern is identified at step 1009. The translator and router then sends a message to the agent group identified in the route list requesting that an idle agent be provided in step 1001. For example, a trunk group may be identified by the route list for a call that is to terminate to a switched network 106, whereas a gateway group may be identified by the route list for a call that is to terminate to a subscriber unit 110. If there is no match for the processed digits, however, then an appropriate signal is sent to the network that originated the call, as provided at step 1008. The agent group polls its group of agents to determine if there is an idle agent and if an idle agent is found, the originating connector ID is passed to the terminating agent group and subsequently to the terminating agent, thereby establishing the communication path between the originating and terminating agent. The call connection between the originating agent and the terminating agent is via the connection path and is established in step 1013. The connection path can support the transmission of the unique protocol needed by each agent (e.g., as is known in the art, the originating agent converts its unique protocol to the protocol of the terminating agent) or the transmission of a standard protocol used to communicate between agents, such as an agent interworking protocol according to an exemplary embodiment of the present invention described below.

Call origination and termination using the call processing architecture according to an exemplary embodiment of the present invention as well as an agent interworking protocol according to an exemplary embodiment of the present invention operates as follows, although the agent interworking protocol is not necessary in order carry out the call processing architecture according to an exemplary embodiment of the present invention, as any known method of establishing communication between agents could be used with the call processing architecture of the present invention.

Assume a telephone call between a subscriber unit 110 and a called party connected to a switched network 106, as illustrated in FIG. 1. When the subscriber unit 110 initiates the call, the subscriber unit 110 transmits a call request signal (e.g., the digits dialed by the calling party) and is connected to the base station controller 432 which is in turn connected to the mobile switching center 434, as illustrated in FIG. 1. Upon receiving the call request signal from the subscriber unit 110, a mobile agent 2011 residing in the mobile switching center 434 is selected by the mobile switching center 434 and establishes the mobile network connection with the subscriber unit 110. For example, the mobile agent 2011 will receive the dialed digits in the unique mobile agent protocol via its external interface and will conduct the mobile network call setup including the assignment of traffic channels. The mobile agent 2011 is now the originating agent.

The mobile agent 2011 sends, for example, a translation request to the translator and router 2000, the translation request including, for example, the dialed number and a translation table index from, for example, an index field of the mobile switching center 434. For example, the translation table index identifies the appropriate translation subtable to use. In the translator and router 2000, a translation subtable is found using the translation table index and the dialed number is indexed into the translation subtable and modified accordingly into a translated number as explained above. For example, the MATCH entries of the translation table are read and if a MATCH is found, the corresponding MODIFY digits are passed back to the originating agent 2011. If the dialed number is not in the subtable, then the translated number is the same as the dialed number. A translate response message is then returned by the translator and router 2000 to the mobile agent 2011 including the translated (e.g., processed) number.

The mobile agent 2011 then sends a routing request to the translator and router 2000 including the translated number, the connector ID and a route table index from a routing index field of the mobile switching center 434. For example, the routing index field identifies the appropriate routing subtable to use. The route subtable is found using the route table index. The translator and router 2000 then indexes the translated number into the route subtable and the route list is obtained as explained above. For example, the MATCH entries of the route table are read and if a MATCH is found for the translated number, the corresponding ROUTE LIST is used to select a terminating agent group. As a result of identifying the call destination, in this example destined for a switched network 106, the translator and router 2000 sends a select request message including the connector ID to the ISUP trunk group 2040 that an idle ISUP agent 2041 be identified. The ISUP trunk group 2040 polls its pool of ISUP agents 2041 and if an idle agent 2041 is found, indicated by a select ACK message, then a connector reference (e.g., AIP reference or ID) is provided to the idle agent. Then a connection is established between the originating and terminating agents. The AIP connector (e.g., a software object with a connector portion and a termination portion) represents the software entity connecting the originating and terminating agents and passes generic AIP messaging between two agents to facilitate communication between the agents. As illustrated in FIG. 8, the translator and router 2000 is the central hub for the agents which are connected to the hub.

If the processed digits are not in the route subtable then, for example, a route nack message is returned to the mobile agent 2011 indicating that there is no route to the destination. If an idle agent 2041 is not available, then a select nack message is returned by the ISUP agent group 2040 indicating that no circuit is available. If an idle agent 2041 is available, however, the translator and router 2000 then returns a route ack message to the originating agent including the route name (e.g., the agent group name) and the AIP reference as described above.

Figure 12:
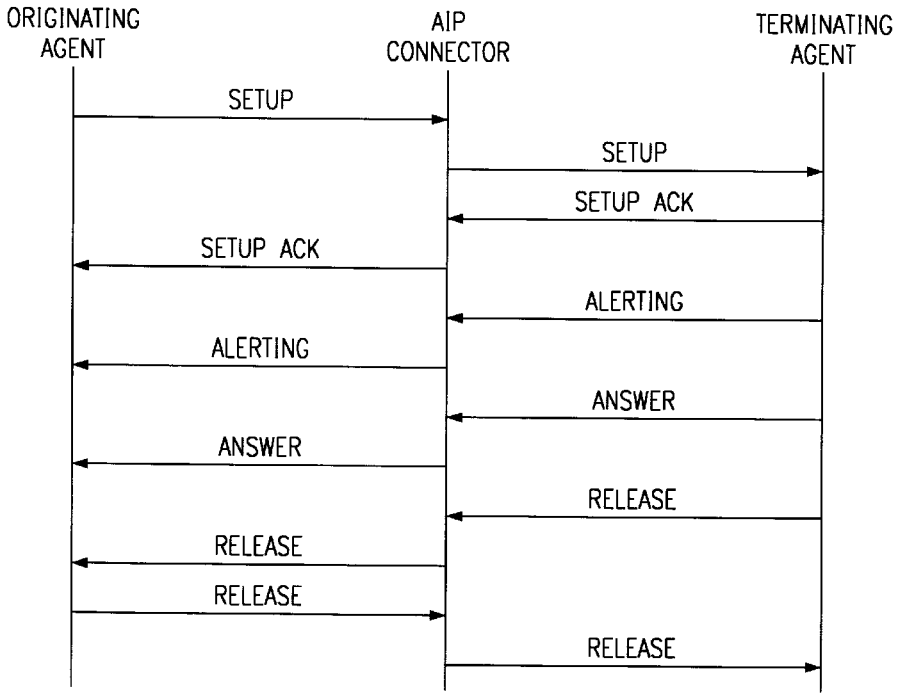
FIG. 12 illustrates an exemplary agent interworking protocol flow according to an exemplary embodiment of the present invention.

FIG. 12 illustrates an exemplary flow of messages utilizing the AIP connector according to an exemplary embodiment of the present invention. As shown in FIG. 12, all of the messages pass through the AIP according to an exemplary embodiment of the present invention. The SETUP messages contain the called number and are used to initiate call termination with the called number. The SETUP ACK messages represent an acknowledgment that call termination with the called party is proceeding. ALERTING messages are used to indicate that the far end (e.g., the called party's network) has commenced establishing the call termination. The ANSWER messages indicate that the far end has answered the call. The RELEASE messages indicate that the near end (e.g., the calling party) or the far end has released the call connection.

Once the originating and terminating agents are connected via the AIP connection, call setup messaging can be communicated between the agents by the originating agent converting the format of its call setup messages to the AIP and the terminating agent receiving the AIP formatted messages and converting the AIP messages to the terminating agent's format. Thus, for example, in the above example, a mobile originating agent 2011 converts the mobile formatted messages to the AIP and an ISUP terminating agent 2041 converts the AIP formatted messages to ISUP formatted messages. For example, the native protocol for each call type is defined by industry standards and includes message fields that can be mapped to, for example the appropriate exemplary fields of the AIP according to the present invention described below. As is obvious to those skilled in the art, the particular implementation of an agent interworking protocol (AIP) can vary as long as each agent contains the capability of converting to and from a standard protocol, referred to here as AIP. Further, in an object oriented implementation of the present invention, the native protocols for each agent as well as a generic protocol can be stored in a memory of for example a switching center as objects. The objects include, for example, the call messages for each protocol. A translation object could also be stored in the memory of the switching center to provide, for each agent, the mapping of messages between the native protocol for the agent and the generic protocol. An exemplary protocol definition for the AIP is set forth below, although varying implementations of the AIP accomplishing the function of a generic protocol used to establish, maintain and release a connection between two call processing agents are within the scope of the present invention.

The AIP according to an exemplary embodiment of the present invention includes several types of messages. Each message element can use, for example, instances of Objec-Time case tool data types, although any structure consisting of data elements could be used. For example, most message elements are instances of a basic type such as Integer and String. Other message elements are instances of a grouping of the basic data types or user defined enumerated types described in detail below. Each message element can be optional (O) or mandatory (M). For example, the aipSetup message is used to initiate a dialog between two call processing agents. It is sent from originator agent to terminator agent and includes, for example, the following message elements illustrated in Table 1.

TABLE 1

| ME | Type | Presence |
|---|---|---|
| route | STRING | M |
| cdrId | INTEGER | O |
| connId | INTEGER | O |
| trunkGroupID | INTEGER | O |
| cellid | MSCCellIdentity | O |
| cpc | INTEGER | O |
| continuity | INTEGER | O |
| echoControl | MSCEchoControl | O |
| ss7Interworking | INTEGER | O |
| calledPartyAddress | MSCGsmNumber | O |
| callingPartyAddress | MSCGsmCallingNum | O |
| originalCalledPartyAddress | MSCGsmOrigCalledNum | O |
| redirectingPartyAddress | MSCGsmRedirectingNum | O |
| satellite | INTEGER | O |
| redirInfo | MSCGsmRedirInfo | O |

The exemplary message elements (ME) shown in Table 1 are described as follows. The callingParty Address message element is to identify the calling party. The calledPartyAddress message element is to identify the called party. The route message element is to identify the agent group of the originator agent. The cdrId message element is to identify the Call Data Record ID of the originator agent. The connId message element is to identify the switching matrix connection for the call. The cellid message element is to identify the cell in which the traffic channel was assigned. It is provided, for example, if the originator agent is processing an emergency call.

The cpc message element contains the Calling Party Category. This field is used by GSM and ISUP agents. The satellite message element is to identify if one or more satellites are involved in the current call. This is important to know because the delay caused by satellite links affects the overall quality of calls and therefore, when possible, multiple satellite hops are avoided. The continuity message element is to pass information about the status of SS7 continuity checking for the current call. If Continuity is not supported, then this message element will always have the default value of 'contNotRequired'. The echoControl message element is to pass information about whether echo devices are already included in a call or need to be inserted in certain situations. If Echo Control is not supported, this message would have the default value of 'ogEchoDevNotIncluded'. The ss7Interworking message element is to pass information about whether the call is all SS7 or whether PSTN interworking (R1, R2, etc.) has occurred.

The calledPartyAddress message element is to pass information about the dialed number including the numbering plan and whether the number is national, international, etc. The callingPartyAddress message element is to pass information about the calling party such as the calling line ID, whether the caller restricts or allows his CLID to be presented. The originalCalledPartyAddress message element is to pass information about the number that a caller was attempting to reach before forwarding redirected the call elsewhere. Information contained includes, for example, the original number that was called and whether that original called party allows his (forwarding) number to be displayed to the forwarded to party. An example use of this information is the situation where multiple people have forwarded phones to the same number. Seeing the original called party as well as the calling party on certain displays can tell not only who is calling, but which of the parties forwarded to this one phone the caller was trying to reach. The redirectingPartyAddress message element is to pass the information about the forwarding party in a call. Example fields are the forwarding party's number and whether the forwarding party allows or restricts his number from being displayed. If only one forwarding occurs in a call, this number will be the same as the original called number, but if multiple forwardings occur, this number will be that of the last forwarding party. An example use of this field is to ensure that if a caller attempts to call a local number that has been forwarded over long-distance, the forwarding party will be charged for the long distance call rather than the calling party that was only trying to make a local call. The redirInfo message element is to pass relevant information about the history of the forwarding of a call (while the redirectingPartyInfo element only has information about the last forwarding party). Example fields include the number of forwardings done in the call, the original forwarding reason, the last forwarding reason, and certain presentation/restriction information.

Another type of message in an exemplary AIP according to an exemplary embodiment of the present invention is the aipSetupAck Message. The aipSetupAck message is used to acknowledge receipt of the aipSetup message and provide information about the terminator agent. It is sent from the terminator agent to the originator agent. Exemplary message elements for a SetupAck Message is shown in Table 2.

TABLE 2

| ME | Type | Presence |
|---|---|---|
| applyRingback | BOOLEAN | M |
| route | STRING | M |
| backwardSetupInfo | MSCGsmBackSetupInfo | O |
| eventInfo | MSCGsmEventINTEGER | O |

The exemplary message elements (ME) shown in Table 2 are described as follows. The applyRingback message element is to tell whether the switch element 304 (e.g., MSC) needs to connect a ringback tone to the originating agent while the MSC attempts to reach the terminating party. It is set whenever the MSC is the terminating office in a call. The route message element is to identify the agent group of the terminating agent. The backwardSetupInfo message element is to pass information back to the originator agent that SS7 exchanges can use to determine how a call should be set up and what facilities are involved. The eventInfo message element is to pass information backwards toward the originator of the call such as whether the terminator is being rung or if forwarding has occurred (and if so what type of forwarding has occurred).

Another type of message in the AIP according to an exemplary embodiment of the present invention is an aipAlerting Message. The aipAlerting message informs the originator agent that the called party's telephone is ringing. It is sent from the terminator agent (mobile agent only) to the originator agent. Exemplary message elements of the aipAlerting message are shown in Table 3.

TABLE 3

| ME | Type | Presence |
|---|---|---|
| backwardSetupinfo | MSCGsmBackSetupInfo | O |
| eventInfo | MSCGsmEventInfo | O |

The backwardSetupInfo message element is to pass information back to the originator agent that SS7 exchanges can use to determine how a call should be set up and what facilities are involved. The eventInfo message element is to pass information backwards toward the originator of the call such as whether the terminator is being rung or if forwarding has occurred (and if so what type of forwarding has occurred), and whether information may be presented to the originator.

Another type of message in the AIP according to an exemplary embodiment of the present invention is an aipAnswer Message. The aipAnswer message informs the originating agent that the called party has received/accepted the call. It is sent from the terminating agent to the originating agent. An exemplary message element of the aipAlerting message is shown in Table 4.

TABLE 4

| ME | Type | Presence |
|---|---|---|
| backwardSetupInfo | MSCGsmBackSetupInfo | O |

The backwardSetupInfo message element is to pass information back to the originator that SS7 exchanges can use to determine how a call should be set up and what facilities are involved.

Another type of message in the AIP according to an exemplary embodiment of the present invention is an aipPlayTone Message. The aipPlayTone message informs the receiver that the sender has requested the application of a DTMF tone at the receiving end. An exemplary message element of the aipPlayTone message is shown in Table 5.

TABLE 5

| ME | Type | Presence |
|---|---|---|
| tone | INTEGER | M |

The tone message element specifies which DTMF tone should be applied.

Another exemplary message of an AIP according to an exemplary embodiment of the present invention is an aipStopTone Message. The aipStopTone message informs the receiver that the sender has requested the termination of a DTMF tone at the receiving end. The aipStopTone message will always be preceded by an aipPlayTone message. There are no message elements in this message.

Another exemplary message of an AIP according to an exemplary embodiment of the present invention is an aipRelease Message. The aipRelease message informs the receiver that the dialog has been terminated by the sender. It can be sent by either the originator or terminator. No reply to this message is expected or should be sent. Exemplary message elements of the aipRelease message are shown in Table 6.

TABLE 6

| ME | Type | Presence |
|---|---|---|
| cause | INTEGER | M |
| meteringPulses | INTEGER | O |
| location | INTEGER | O |
| disconnectingParty | INTEGER | O |

The cause message element is to provide the reason why the dialog was terminated. The meteringPulses message element is to provide the number of meter pulses received from the superior exchange for the call. The location message element is to provide the location at the network level of the initiator of the dialog release. The disconnectingParty message element indicates whether the calling party, called party or network released the call.

Another exemplary message element of an AIP according to an exemplary embodiment of the present invention is an aipRetry message. The aipRetry message has, for example, one element, cause. The cause message element is sent by the terminator trunk to the originator during glare conditions (e.g., attempt to access both paths of a bi-directional bus simultaneously) or a seize failure condition. The cause message element indicates the reason for the failure. Upon receipt of the cause message by the originating agent, the originating agent retries call routing.

The AIP according to an exemplary embodiment of the present invention can also include user defined message element types. All message elements can use, for example, instances of ObjecTime data types. Most are instances of a basic ObjecTime data types such as INTEGER and STRING, as illustrated in the above tables. Others are instances of a grouping of the basic ObjecTime data types or user defined enumerated types, also as illustrated in the above tables.

The type definitions below show the user defined type used in some of the messages above.

| MSCCellIdentity Type | | |
|---|---|---|
| Sub-Element | Type | Presence |
| mcc | STRING | M |
| mnc | STRING | M |
| lac | INTEGER | M |
| cid | INTEGER | M |

The mcc sub-element is to specify the Mobile Country Code. The mnc sub-element is to specify the Mobile Network Code. The lac sub-element is to specify the Location Area Code. The cid sub-element is to specify the Cell Identifier.

| MSCGsmNumber Type | | |
|---|---|---|
| Sub-Element | Type | Presence |
| digits | STRING | M |
| ton | INTEGER | M |
| npi | INTEGER | M |

The digits field is to carry an address. The ton (type of number) message element is to give information associated with an address indicating the nature of the number. For example, the number could be an international number, a national number, or an ISDN subscriber number. The npi (numbering plan identifier) message element is to give the associated specification used to determine the meaning of the numbers in an address. Examples are the ISUP numbering plan defined in ITU E.164 and the Data Numbering Plan defined in ITU X.121.

| MSCGsmCallingNum Type | | |
|---|---|---|
| Sub-Element | Type | Presence |
| digits | STRING | M |
| ton | INTEGER | M |
| npi | INTEGER | M |
| ni | INTEGER | M |
| pi | INTEGER | M |

The digits field is to carry the address of the originating (calling) party in this call. The ton (type of number) message element is to give information associated with an address indicating the nature of the number. For example, the number could be an international number, a national number, or an ISDN subscriber number. The npi (numbering plan identifier) message element is to give the associated specification used to determine the meaning of the numbers in an address. Examples are the ISUP numbering plan defined in ITU E.164 and the Data Numbering Plan defined in ITU X.121. The ni (number incomplete) message element is to tell that though a calling address is included, it is not the complete calling party address. The pi (presentation indicator) message element is to tell whether the address information may be presented to an end user for potential display on a calling line ID device.

| MSCGsmOrigCalledNum Type | | |
|---|---|---|
| Sub-Element | Type | Presence |
| digits | STRING | M |
| ton | INTEGER | M |
| npi | INTEGER | M |
| pi | INTEGER | M |

The purpose of the address digits here is to give the identity of the original party that the caller wished to reach before any forwarding occurred. The ton (type of number) message element is to give information associated with an address indicating the nature of the number. For example, the number could be an international number, a national number, or an ISDN subscriber number. The npi (numbering plan identifier) message element is to give the associated specification used to determine the meaning of the numbers in an address. Examples are the ISUP numbering plan defined in ITU E.164 and the Data Numbering Plan defined in ITU X.121. The pi (presentation indicator) message element is to tell whether the address information may be presented to an end user for potential display on a calling line ID device.

| MSCGsmRedirectingNum Type | | |
|---|---|---|
| Sub-Element | Type | Presence |
| digits | STRING | M |
| ton | INTEGER | M |
| npi | INTEGER | M |
| pi | INTEGER | M |

The purpose of the address digits here is to give the identity of the last party that forwarded the call. If only one forwarding occurs this will be the same as the original called party address. The ton (type of number) message element is to give information associated with an address indicating the nature of the number. For example, the number could be an international number, a national number, or an ISDN subscriber number. The npi (numbering plan identifier) message element is to give the associated specification used to determine the meaning of the numbers in an address. Examples are the ISUP numbering plan defined in ITU E.164 and the Data Numbering Plan defined in ITU X.121. The pi (presentation indicator) message element is to tell whether the address information may be presented to an end user for potential display on a calling line ID device.

| MSCGsmRedirInfo Type | | |
|---|---|---|
| Sub-Element | Type | Presence |
| redirectingInd | INTEGER | M |
| origRedirReason | INTEGER | M |
| redirCounter | INTEGER | M |
| redirReason | INTEGER | M |

The redirectingInd message element is to tell whether the call has been forwarded or rerouted and whether or not presentation of redirection information to the calling party is restricted. The origRedirReason message element is to tell the reason the call was originally redirected.

The redirCounter message element is to indicate the number of redirections which have occurred on a call. The redirReason message element is to tell, in the case of a call undergoing multiple redirections, the reason why the last redirection has occurred.

| MSCGsmBackSetupInfo Type | | |
|---|---|---|
| Sub-Element | Type | Presence |
| chargeInfo | INTEGER | M |
| calledPtyStatus | INTEGER | M |
| ss7Interworking | INTEGER | M |
| echoControl | MSCEchoControl | M |

The MSCGsmBackSetupInfo type is passed from terminator to originator to indicate the facilities involved in the call setup, e.g., echo cancellers, SS7 interworking or charging. The chargeInfo message element is to tell whether or not the call is chargeable. The calledPtyStatus message element is to tell the state of the called party. For example, 'subscriber free' if the called party is not on a call. The ss7interworking message element is to tell whether or not SS7 is used in all parts of the network connection. The echoControl message element is to pass information about whether echo devices are already included in a call or need to be inserted in certain situations. If Echo Control is not supported, then this message element will have the default value of 'icEchoDevNotIncluded'.

| MSCGsmEventInfo Type | | |
|---|---|---|
| Sub-Element | Type | Presence |
| eventInd | INTEGER | M |
| eventPresentation | INTEGER | M |

The eventInd message element is to give more information about the reason that an aipSetupAck or aipAlerting message has been sent (e.g., to communicate call event information). For example, two reasons these messages are sent are to show further progress in the call or to tell that alerting is occurring. This message element could also pass information about the reason a call was forwarded. The eventPresentation message element is to give more information about whether information about the progress of the call can be displayed back to the originator of the call. This field can be set true if the forwarding options from eventInd (which may not be used) are the situations in which eventPresentation might be restricted. An example of possible future use is a user could restrict presentation of event information so that the originator could not tell if the call had been forwarded or not.

| MSCEchoControl Type | | |
|---|---|---|
| Sub-Element | Type | Presence |
| enabled | BOOLEAN | M |
| info | INTEGER | M |
| erl | INTEGER | M |

The enabled message element is to pass information about whether a per-trunk echo cancellor is enabled for a specific call. This field gives information only about whether local echo control is on. The info field gives information about whether echo control is being done anywhere in the call (even on other switches). The info message element is to pass information about whether echo control has already been set at the originator or terminator of a call. This information is important because on long calls, if info about whether echo is set or not is not included, then too many or too few echo cancellors may be inserted into the call. The erl (echo return loss) field contains an estimate of the loss associated with echo in this call. The value is taken from the trunk information stored in the OAM server and entered through the NMS. This field is used, for example, to train the echo cancellor.

Figure 13:
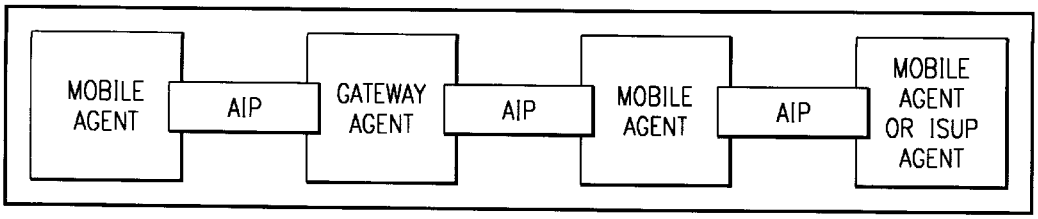
FIG. 13 illustrates exemplary agent connections using an agent interworking protocol according to an exemplary embodiment of the present invention.

FIG. 13 illustrates another example of the operation of the AIP with respect to a mobile to mobile call, e.g., from a first subscriber terminal 110 to a second subscriber terminal 110 of a telecommunications system 100. As illustrated in FIG. 13, in accordance with an exemplary embodiment of the present invention is a mobile to mobile call. When the first subscriber terminal 110 originates the call, the dialed digits are received at the mobile switching center 434 and the mobile switching center 434 assigns a mobile agent 2011 to set up the -originating half of the call between the first mobile subscriber 110 and the mobile switching center 434. The mobile agent 2011 sends a translation request to the translator and router 2000 along with a translation table index. The translator and router 2000 reads the MATCH entries of the appropriate translation table and if a MATCH is found, the corresponding MODIFY digit pattern is returned to the mobile agent 2011, which then sends a routing request to the translator and router 2000 along with a routing table index. The translator and router reads the MATCH entries of the appropriate route table and if a MATCH is found, the ROUTE LIST is used to select an agent group and an idle agent, in this case gateway agent 2021 (e.g., the agent used to connect to another subscriber terminal 110). As described earlier, the selection of a gateway agent 2021 includes the allocation of an AIP connector (e.g., via the AIP reference number provided to the originating and terminating agents by the translator and router 2000) from the AIP connector pool 2001 that establishes the link between mobile agent 2011 (the originating agent) and gateway agent 2021 (the terminating agent). Gateway agent 2021, using the incoming translated digits from the mobile agent 2011, accesses the home location register 504 of the telecommunications system 100 to determine the location of the second subscriber terminal 110. As is known in the art, a home location register 504 contains the administrative information associated with each subscriber terminal 110 registered in the telecommunications system 100 along with the current location of each subscriber terminal 110.

The home location register 504 may return the same or a different digit string depending on the location of the second subscriber terminal (e.g., in the network or roaming outside of the network). Using the digit string received from the home location register 504, the gateway agent 2021 (now acting as an originating agent) sends a translation request and a translation table index to the translator and router 2000 to translate the digit pattern. If a MATCH is found, the translated digit pattern is returned to the gateway agent 2021 and a routing request and route table index are sent to the translator and router 2000 to determine if there is a MATCH and corresponding ROUTE LIST for the translated digits. Since the call in this example is to a subscriber terminal 110, the ROUTE LIST in the route subtable must include a mobile agent group 2010 (e.g., GSM), which is a pool of mobile connections (e.g., mobile agents 2011) via radio channels. In addition to identifying the mobile agent group 2010 to the gateway agent 2021 (now the originating agent), the translator and router 2000 will also allocate an AIP connection and provide a reference number for the allocated AIP connection to the gateway agent 2021 and, via the mobile agent group 2010, to a second mobile agent 2011 (now the terminating agent) to complete the connection of the call from the first subscriber terminal 110 to the second subscriber terminal 110. As is evident from this example, using the AIP according to an exemplary embodiment of the present invention allows agents, such as the gateway agent 2021, to communicate with the home location register 504 using the native MAP protocol required to interface with the HLR (via the external interface of agent 2021) and also to communicate with all other agents using AIP (via the internal interface of agent 2021). Further, the use of a generic call message protocol to connect agents allows new agents (e.g., for new call types) to be easily added to the telecommunications system as no integration problems arise due to the generic interface protocol between all agents, -whether new or existing.

If in the above example a call forwarding feature was activated by the second subscriber terminal 110, a daisy chain of AIP connections between agents would result, in contrast the operation of conventional communication systems. For example, in conventional communication systems, each agent is required to perform complex tasks in a call forwarding situation such as evaluating the downstream situation and taking appropriate action such as breaking down the existing connection and establishing a new connection to get to the desired destination. In contrast, using the AIP connection between agents according to an exemplary embodiment of the present invention allows agents to be easily connected in a daisy chain until the destination agent is reached without requiring complicated tasks be performed by each agent other than conversion between the AIP and an agent's native protocol.

For example, according to an exemplary embodiment of the present invention, the first mobile agent 2011 and the gateway agent 2021 in the previous example would be connected via an AIP connection, and the gateway agent 2021 and the second mobile agent 2011 would be connected by a separate AIP connection. If the second mobile agent 2011 determined that call forwarding was activated for the second subscriber terminal 110 or that the call needed to be redirected for any reason, then, in the same manner described in detail above via interaction with the translator and router 2000, the second mobile agent 2011 would obtain an AIP connection with the agent responsible for establishing the connection with the forwarded number, which could be another subscriber terminal 110 invoking a third mobile agent 2011 or a network connection requiring one or more IUSP, TUP or R2 agents to complete the call, as shown in FIG. 13. Thus, a chain of agents can be daisy-chained together using the AIP protocol thereby providing an elegant building block concept for handling call forwarding not provided by conventional communication systems that also reduces the processing capabilities required by each agent. As noted earlier, using the AIP according to an exemplary embodiment of the present invention is not required to practice the call processing architecture according to the present invention and could be used with other call processing architectures, but does provide a further improvement on the operation of the call processing architecture according to the present invention.

The present invention is well adapted to carry out the objects and attain the ends and advantages mentioned, as well as others inherent therein. While an exemplary embodiment of the invention have been given for the purposes of disclosure, alternative embodiments, changes and modifications in the details of construction, interconnection and arrangement of parts will readily suggest themselves to those skilled in the art after having the benefit of this disclosure. This invention is not necessarily limited to the specific embodiment and examples illustrated and described above. All embodiments, changes and modifications encompassed within the spirit of the invention are included, and the scope of the invention is defined by a proper construction of the following claims.

What is claimed is:

1. A call processing application of a wireless telecommunications system, comprising:

a software entity modeling a home location register;

a software entity modeling a visitor location register; and a software entity modeling a switching center that communicates with the home location register modeled software entity and the visitor location register modeled software entity.

2. The call processing application according to claim 1, wherein the home location register modeled software entity and the visitor location register modeled software entity each encapsulate one or more operations and wherein the switching center modeled software entity is configured to invoke the encapsulated operation(s) of the home location register modeled software entity and the visitor location register modeled software entity.

3. The call processing application according to claim 1, further comprising a common processor to execute software code associated with the switching center modeled software entity, the home location register modeled software entity and the visitor location register modeled software entity.

4. The call processing application according to claim 1, further comprising an object request broker to form virtual connections with software entities of an application other than the call processing application with the home location register modeled software entity, the visitor location register modeled software entity and the switching center modeled software entity.

5. The call processing application according to claim 1, wherein the home location register modeled software entity comprises one or more software objects.

6. The call processing application according to claim 1, wherein the visitor location register modeled software entity comprises one or more software objects.

7. The call processing application according to claim 1, wherein the switching center modeled software entity comprises one or more software objects.

8. The call processing application according to claim 1, further comprising a software entity modeling a radio controller that communicates with the switching center.

9. The call processing application according to claim 8, wherein the radio controller is a base station controller.

10. The call processing application according to claim 8, wherein the radio controller modeled software entity comprises one or more software objects.

11. The call processing application according to claim 1, further comprising a software entity that models an application provider that is configured to provide protocol related information to the visitor location register modeled software entity and the home location register modeled software entity.

12. The call processing application according to claim 1, wherein the application provider modeled software entity comprises one or more software objects.

13. A wireless telecommunications system comprising:

a call processor assembly including a call processing application that comprises a software entity modeling a home location register, a software entity modeling a visitor location register, and a software entity modeling a switching center; and a network management system coupled to the call processor.

14. The wireless telecommunications system according to claim 13, wherein the call processing application further includes a common processor to execute software code associated with the switching center modeled software entity, the home location register modeled software entity and the visitor location register modeled software entity.

15. The wireless telecommunications system according to claim 13, wherein the network management system includes one or more software entities configured to receive and communicate operations, administration and maintenance related information to the home location register modeled software entity.

16. The wireless telecommunications system according to claim 13, wherein the network management system includes at least one software entity that is configured to present and receive operations, administration and maintenance related information to a user, and at least one software entity that is configured to store operations, administration and maintenance related information and communicate operations, administration and maintenance related information to the home location register modeled software entity.

17. The wireless telecommunications system according to claim 13, wherein the network management system includes one or more software entities configured to receive and communicate operations, administration and maintenance related information to the visitor location register modeled software entity.

18. The wireless telecommunications system according to claim 13, wherein the network management system includes at least one software entity that is configured to present and receive operations, administration and maintenance related information to a user, and at least one software entity that is configured to store operations, administration and maintenance related information and communicate operations, administration and maintenance related information to the visitor location register modeled software entity.

19. The wireless telecommunications system according to claim 13, wherein the network management system includes one or more software entities configured to receive and communicate operations, administration and maintenance related information to the switching center modeled software entity.

20. The wireless telecommunications system according to claim 13, wherein the network management system includes at least one software entity that is configured to present and receive operations, administration and maintenance related information to a user, and at least one software entity that is configured to store operations, administration and maintenance related information and communicate operations, administration and maintenance related information to the switching center modeled software entity.

21. The wireless telecommunications system according to claim 13, further comprising a software entity modeling an application provider that is configured to provide protocol -related information to the visitor location register modeled software entity and the home location register modeled software entity.

22. The wireless telecommunications system according to claim 21, wherein the network management system includes one or more software entities configured to receive and communicate operations, administration and maintenance related information to the application provider modeled software entity.

23. The wireless telecommunications system according to claim 21, wherein the network management system includes at least one software entity that is configured to present and receive operations, administration and maintenance related information to a user, and at least one software entity that is configured to store operations, administration and maintenance related information and communicate operations, administration and maintenance related information to the application provider modeled software entity.

24. The wireless telecommunications system according to claim 13, further comprising a software entity modeling a base station controller that communicates with the switching center.

25. The wireless telecommunications system according to claim 24, wherein the network management system includes one or more software entities configured to receive and communicate operations, administration and maintenance related information to the base station controller modeled software entity.

26. The wireless telecommunications system according to claim 24, wherein the network management system includes at least one software entity that is configured to present and receive operations, administration and maintenance related information to a user, and at least one software entity that is configured to store operations, administration and maintenance related information and communicate operations, administration and maintenance related information to the base station controller modeled software entity.

27. A method for processing calls in a wireless telecommunications system that is operable to establish radio connections with a plurality of subscriber units comprising:

providing a distinct software entity, having associated operations, for a visitor location register;

providing a distinct software entity, having associated operations, for a switching center;

receiving a call directed to or originating from a particular one of the subscriber units;

processing subscriber related information for the particular subscriber unit through the operations associated with the visitor location register software entity; and causing the switching of the call to or from the particular subscriber unit based on the processed subscriber related information through the operations associated with the switching center software entity.

28. The method for processing calls in a wireless telecommunications system according to claim 27, further comprising:

providing an agent within the switching center software entity for an application provider to translate information provided to the visitor location register associated software entity.

29. The method for processing calls in a wireless telecommunications system according to claim 27, further comprising:

providing a distinct software entity, having associated operations, for a home location register;

processing additional subscriber related information for the particular subscriber unit through the operations associated with the home location register software entity; and causing the switching of the call to or from the particular subscriber unit based on the additional processed subscriber related information through the operations associated with the switching center software entity.

30. The method for processing calls in a wireless telecommunications system according to claim 29, further comprising:

providing a software entity for an application provider to translate information provided to the home location register associated software entity.

31. The method for processing calls in a wireless telecommunications system according to claim 29, further comprising:

providing a first agent associated with an origination of a call connection;

converting a call setup message from a first format to a standard format via the first agent;

providing a second agent associated with a destination of a call connection; and converting the standard format call setup message to a another format.

* * * * *